(12) United States Patent
Hurley

(10) Patent No.: US 7,376,529 B1
(45) Date of Patent: May 20, 2008

(54) VALVE TESTER CONTROL ENHANCEMENTS

(76) Inventor: Lyndon J. Hurley, P.O. Box 70, Harrisburg, SD (US) 57032

( * ) Notice: Subject to any disclaimer, the term of this patent is extended or adjusted under 35 U.S.C. 154(b) by 0 days.

(21) Appl. No.: 11/058,506

(22) Filed: Feb. 15, 2005

Related U.S. Application Data

(63) Continuation-in-part of application No. 10/351,636, filed on Jan. 24, 2003.

(51) Int. Cl.
*G01L 25/00* (2006.01)
(52) U.S. Cl. .................................... 702/113
(58) Field of Classification Search ............... 166/330, 166/332.2; 702/114, 113; 251/27
See application file for complete search history.

(56) References Cited

U.S. PATENT DOCUMENTS

| | | |
|---|---|---|
| 1,979,340 A | 11/1934 | Norman |
| 2,548,146 A | 4/1951 | Ferris |
| 2,548,147 A | 4/1951 | Ferris |
| 2,746,720 A | 5/1956 | Cannon |
| 3,417,953 A | 12/1968 | Hillquist |
| 3,565,372 A | 2/1971 | Jones |
| 3,572,380 A | 3/1971 | Jackson |
| 4,063,359 A | 12/1977 | Luscombe |
| 4,183,489 A | 1/1980 | Copher |
| 4,463,858 A | 8/1984 | Bilas |
| 4,478,041 A | 10/1984 | Pollman |
| 4,481,770 A | 11/1984 | Lohbauer et al. |
| 4,523,286 A | 6/1985 | Koga et al. |
| 4,561,459 A * | 12/1985 | Jackman ............ 137/291 |
| 4,600,364 A | 7/1986 | Nakatani et al. |
| 4,869,002 A | 9/1989 | Glenn |
| 4,883,249 A | 11/1989 | Garland |
| 4,961,471 A | 10/1990 | Ovens |
| 4,987,690 A | 1/1991 | Aaldenberg |
| 5,299,770 A | 4/1994 | Sayles |
| 5,330,014 A | 7/1994 | Wagner |
| 5,381,996 A | 1/1995 | Arnemann |
| 5,503,423 A | 4/1996 | Roberts |

(Continued)

FOREIGN PATENT DOCUMENTS

EP 0 089 412 A2 9/1983

OTHER PUBLICATIONS

E. H. Wachs Companies, "Truck Mounted Valve Operator Model TM-7," Product Manual, Jan. 2004, pp. 1-55.*

(Continued)

*Primary Examiner*—John Barlow
*Assistant Examiner*—Lisa Sievers
(74) *Attorney, Agent, or Firm*—Jeffrey A. Proehl; Woods, Fuller, Shultz & Smith PC

(57) ABSTRACT

A valve tester system is disclosed that comprises a valve tester assembly for rotating a valve stem of a valve. The valve tester assembly may include a support, a rotation element mounted on the support for rotating a valve during a rotation event, a control element for controlling aspects of the rotation event of the valve by the rotation element, and an element for detecting a location of the valve tester assembly during the rotation event of the valve. In some embodiments of the invention, the element for detecting the location of the valve tester assembly includes a Global Positioning Satellite (GPS) receiver. In some embodiments, the GPS receiver is integral with the control element.

34 Claims, 20 Drawing Sheets

U.S. PATENT DOCUMENTS

| | | | |
|---|---|---|---|
| 5,540,006 | A | 7/1996 | Lloyd |
| 5,556,217 | A | 9/1996 | Deyo |
| 5,560,130 | A | 10/1996 | Bapst |
| 5,662,176 | A | 9/1997 | Madgwick |
| 5,746,404 | A | 5/1998 | Merko |
| 5,809,779 | A | 9/1998 | Bruso |
| 5,876,005 | A | 3/1999 | Vasconi |
| 5,937,373 | A | 8/1999 | Ferrar |
| 6,009,905 | A | 1/2000 | Arnemann |
| 6,056,065 | A | 5/2000 | Campbell |
| 6,125,868 | A | 10/2000 | Murphy |
| 6,129,371 | A | 10/2000 | Powell |
| 6,131,391 | A | 10/2000 | Poorman |
| 6,142,180 | A | 11/2000 | Woodling |
| 6,155,359 | A | 12/2000 | Gardner |
| 6,179,068 | B1 | 1/2001 | West |
| 6,550,734 | B1 | 4/2003 | Spadea |
| 6,701,913 | B1 | 3/2004 | LeDuc |
| 7,036,606 | B2 | 5/2006 | Rossi |
| 2001/0053970 | A1* | 12/2001 | Ford et al. ............... 704/9 |
| 2005/0076965 | A1 | 4/2005 | Buckner et al. |
| 2005/0166350 | A1 | 8/2005 | Buckner |

OTHER PUBLICATIONS

E. H. Wachs Companies, "Wachs ValveCard 1.2", Product Manual, Sep. 1998, pp. 1-26.*

The Wachs Company, "Automated Valve Operating Systems", (pp. 1-4).

The Waches Company, "Automated Valve Operating Systems", pp. 1-6, U.S.A.

Exhibit A: Invoice of Hurco Technologies dated Jul. 23, 2002.

Exhibit B: Photograph of Prototype invoiced on Jul. 23, 2002.

Exhibit C: Photograph of Prototype invoiced on Jul. 23, 2002.

Exhibit D: Photograph of Prototype invoiced on Jul. 23, 2002.

Exhibit E: Photograph of Prototype invoiced in Jul. 23, 2002.

* cited by examiner

VALVE TESTER CONTROL ENHANCEMENTS

REFERENCE TO RELATED APPLICATION

This application is a continuation-in-part of my patent application Ser. No. 10/351,636, filed Jan. 24, 2003, which is incorporated by reference herein in its entirety.

BACKGROUND OF THE INVENTION

1. Field of the Invention

The present invention relates to valve testing apparatus that rotate the valve control to open and close the valve, and more particularly pertains to improvements in valve testing apparatus that facilitate rotation of the valve in a manner that minimizes the potential for damage to the valve during the rotation event, and also facilitates accurate detection and recording of the most pertinent aspects of the rotation event for memorializing the rotation event for maintaining complete records of the maintenance of the valve.

2. Description of the Prior Art

Valves, particularly those used to control the flow of water in municipal distribution systems, spend virtually the entirety of their useful lives in either an open condition or a closed condition, with normally no movement between those conditions, especially if the valve is located underground in a distribution line or on a street hydrant. These long periods of remaining in a single state tends to make it difficult to change the condition of the valve in those few times when change is desired, such as in emergency situations when a leak develops in a pipe connected to the valve. Therefore, it is desirable to periodically "exercise", or rotate the control stem of the valve between the open and closed conditions not only to avoid freeze up due to long periods of in action, but also to verify that the valve is operational.

A rotation event for a valve being tested typically includes rotating the control stem of the valve from one limit of travel (e.g., the fully open condition) to the other limit of rotation (e.g., the fully closed condition). This cycle may be repeated if desired, but is performed to establish that the valve is still functional.

Further, it has become increasingly desirable to record, both accurately and completely, various aspects of the valve exercising or rotation event. Because the valves to be tested are in typically in widely scattered and sometimes remote locations, the ability to record the pertinent information about the rotation event and bring that information back to a central database containing collected information about the valves is not only highly desirable, but may be critical to keeping valves operational in times of emergency. However, previous valve testing or exercising apparatus have relied heavily upon the operator to locate each of the valves to be tested, and accurately identify each of the particular valves being tested. While data regarding a particular valve rotation event may be recorded in an automated or automatic manner by the valve testing apparatus, the known systems rely entirely on the operator to accurately identify which valve is being tested during each rotation event. If the valve has not been accurately identified by the operator, which is certainly conceivable when the area of a single road intersection may have two, three, four or more different underground valves to be located and tested, the data that is recorded is not associated with the correct valve. Unfortunately, when the valve testing system relies solely upon the operator to identify the valve being tested, it is also conceivable that the same valve could be tested over and over but be "identified" as a number of different valves simply by entering a different valve identification for each "test", and such abuse may be hard to detect in the limited information recorded during the test.

Thus, there is a need for a valve testing apparatus that is capable of identifying different valves independently of the operator's identification so that mistakes in valve identification do not cause the test data from a rotation event to be associated with the wrong valve.

SUMMARY OF THE INVENTION

In one aspect of the present invention, a valve tester system is contemplated that comprises a valve tester assembly for rotating a valve stem of a valve. The valve tester assembly may include a support, a rotation element mounted on the support for rotating a valve during a rotation event, a control element for controlling aspects of the rotation event of the valve by the rotation element, and an element for detecting a location of the valve tester assembly during the rotation event of the valve. In some embodiments of the system, the element for detecting the location of the valve tester assembly includes a Global Positioning Satellite (GPS) receiver. In some embodiments, the GPS receiver is integral with the control element.

In another aspect of the present invention, a method of testing a valve is contemplated that comprises positioning a valve tester assembly above the valve, engaging the valve with the valve tester assembly, rotating the valve using the valve tester assembly during a rotation event, and detecting a location of the valve tester assembly during the rotation event of the valve. In some implementations of the method, the step of detecting the location of the valve tester assembly includes receiving a Global Positioning Satellite (GPS) signal using a GPS signal receiver. In some implementations, the step of receiving a GPS signal by the GPS signal receiver is performed while the valve tester assembly is rotating the valve. In some implementations, the step of detecting the location of the valve tester assembly further includes recording the detected location in memory of the valve tester assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

One advantage of the suspension portion of the valve tester assembly of the present invention is that the task of operating or testing or exercising a valve is in most cases converted from a multiple person job to a job that can be performed by a single worker.

Another advantage of the suspension portion of the valve tester assembly of the present invention is that precise positioning of a vehicle carrying the invention is not necessary, and the efficiency of the process of testing underground valves is thereby increased.

Yet another advantage of the suspension portion of the valve tester assembly of the present invention is that not only is the task of testing the valve converted from a two person job into a one person job, but the physical requirements for the person performing the task is reduced, thus reducing the potential for injury or accidents.

Still another advantage of the present invention is the ability to accurately identify the location of a valve being tested or exercised, in a manner that is independent of the input of the operator, so that data collected during a rotation event can be accurately associated with the correct valve.

Other advantages of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF AN EMBODIMENT

Figure 1:
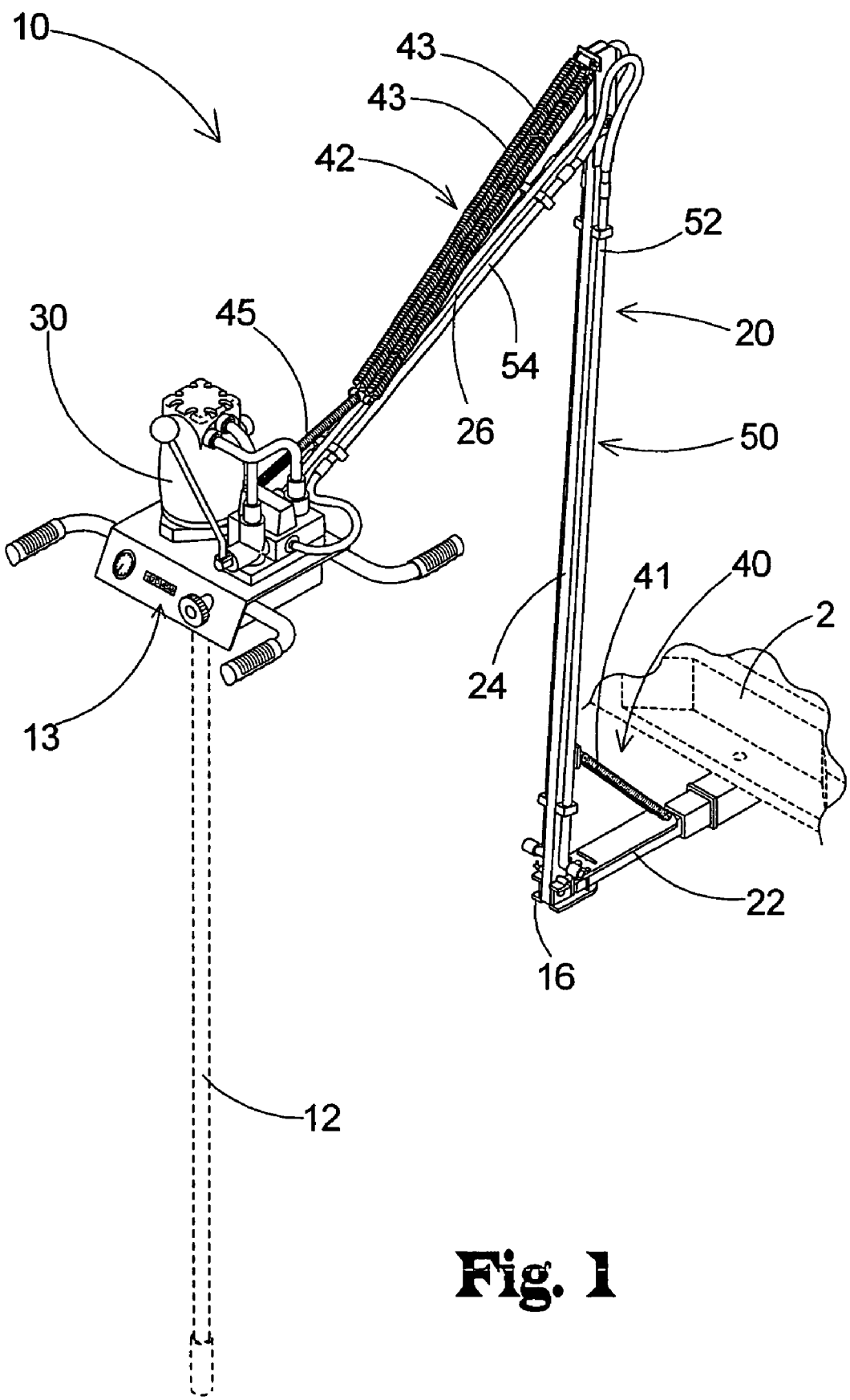
FIG. 1 is a perspective view of a new valve tester suspension assembly according to the present invention.
Figure 2:
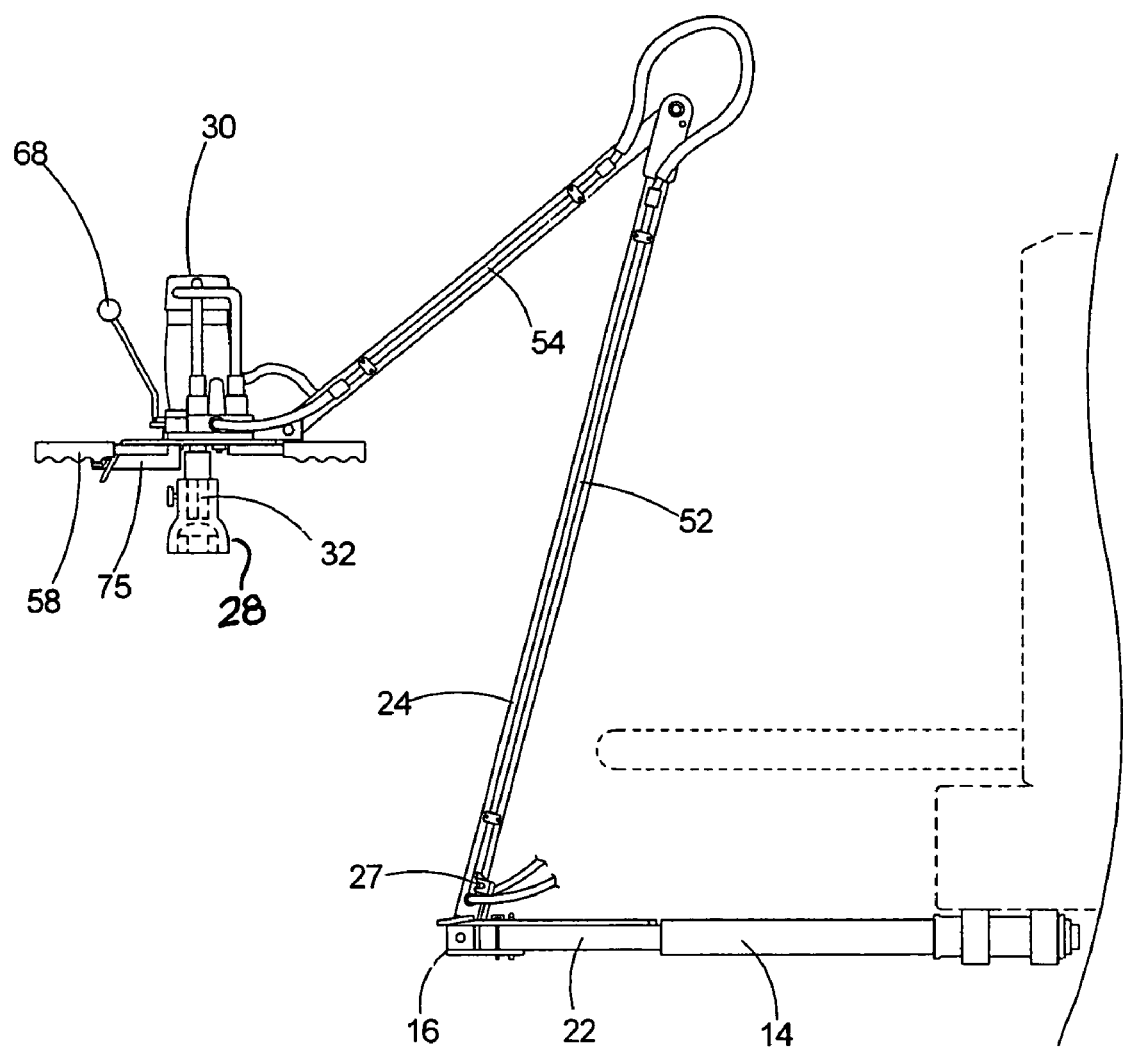
FIG. 2 is a side view of an embodiment of the present invention.
Figure 3:
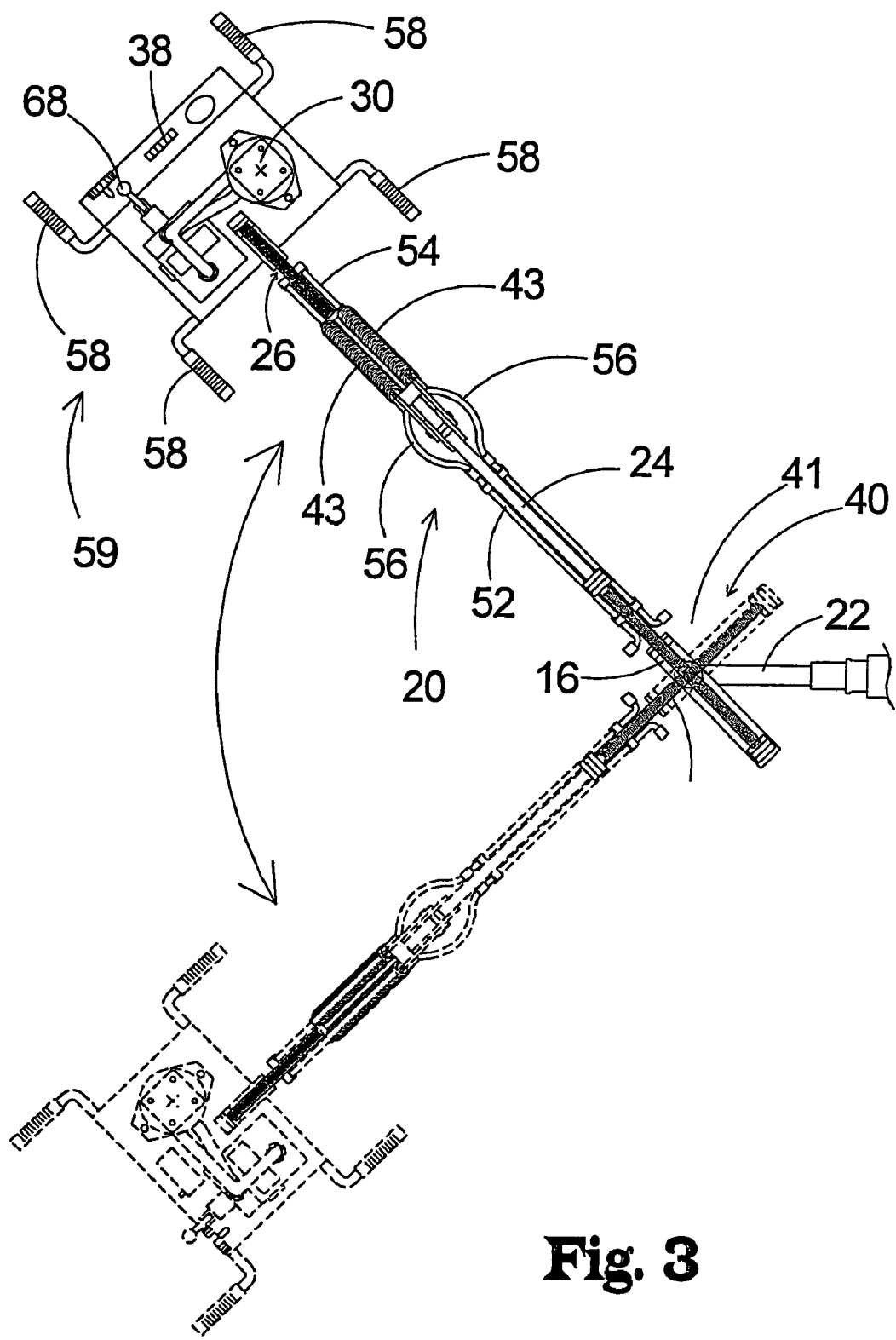
FIG. 3 is a perspective view of the present invention in an extended in use position.
Figure 4:
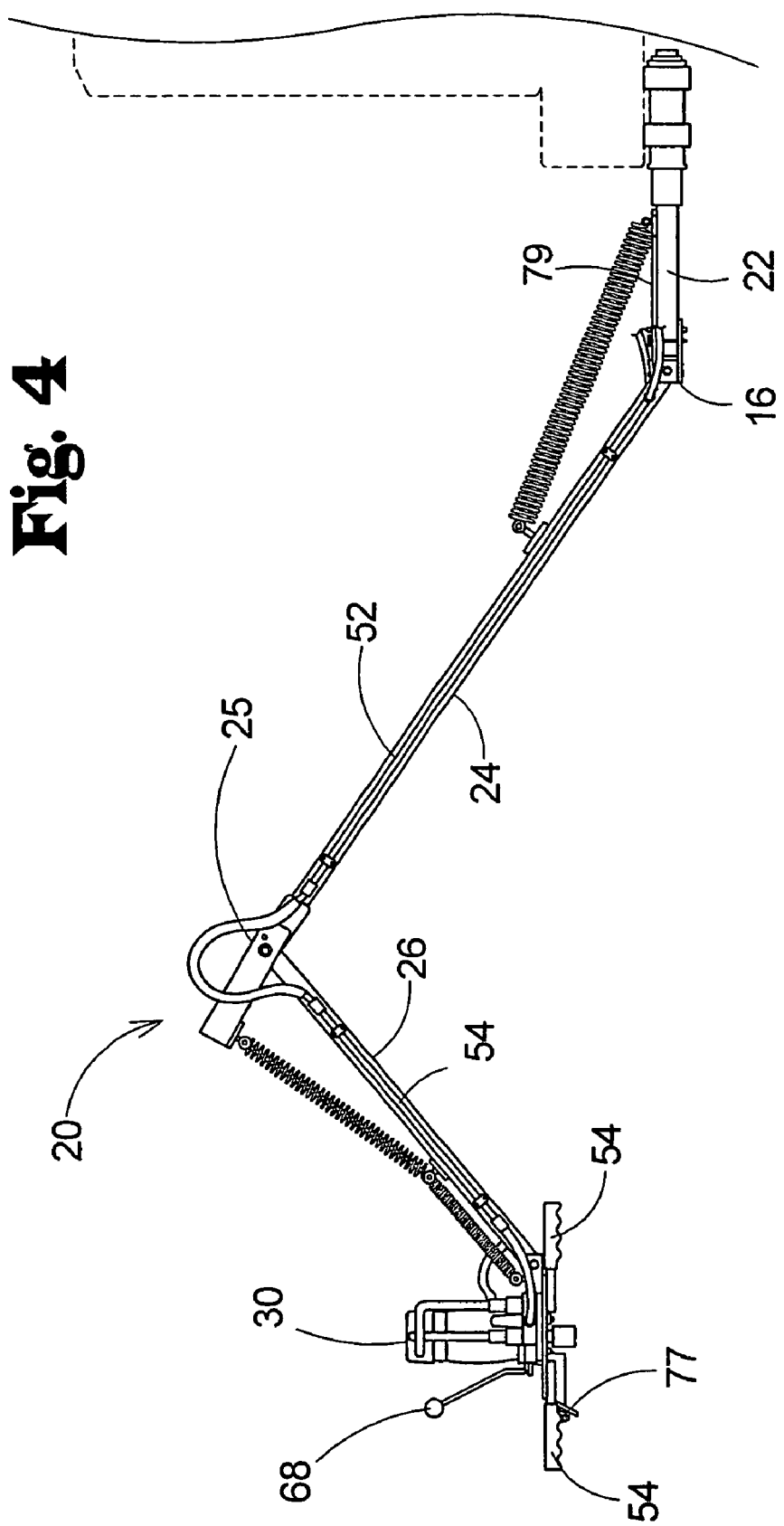
FIG. 4 is a side view of the present invention in an extended position resting on a ground surface.
Figure 5:
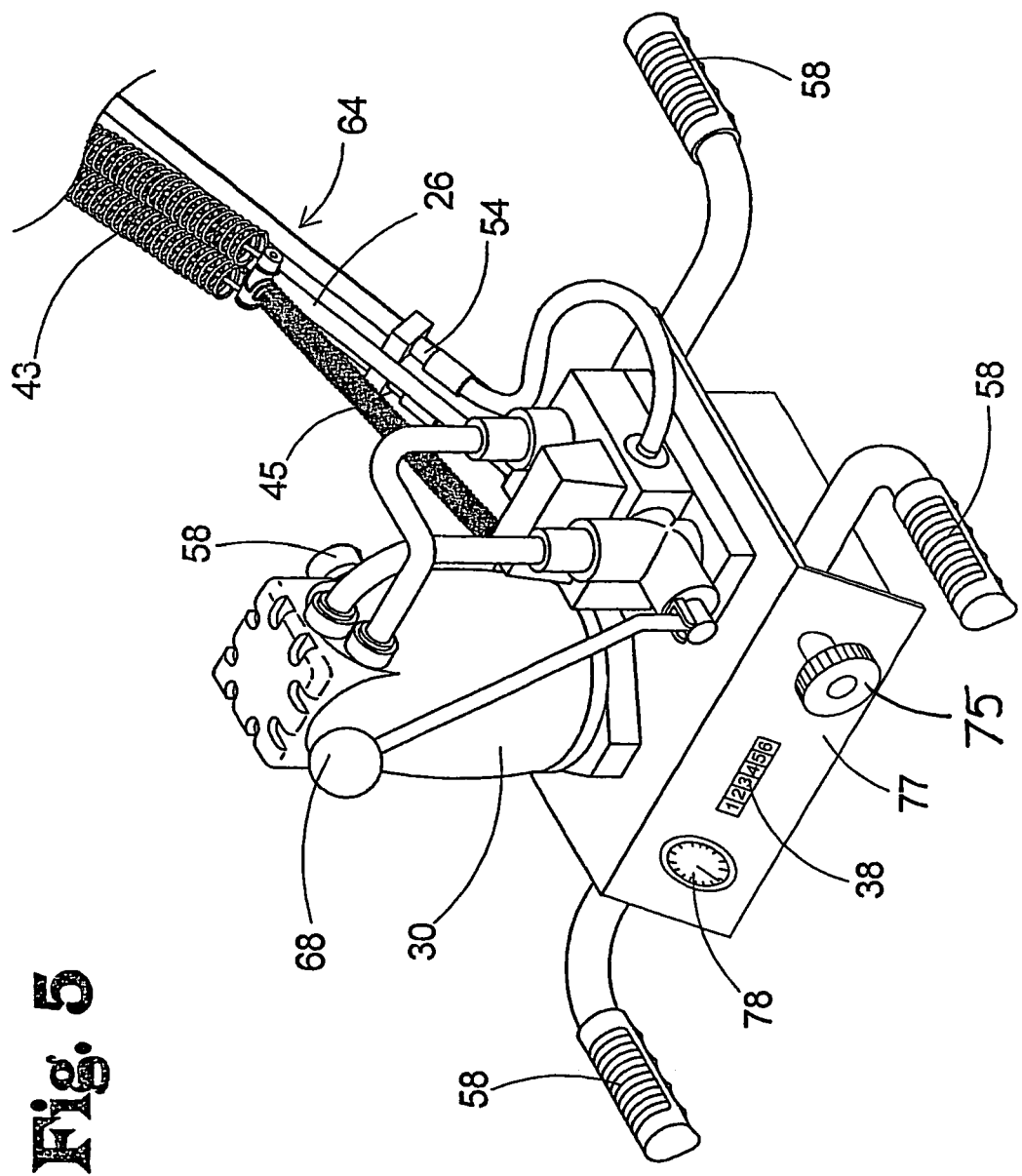
FIG. 5 is a perspective view of the rotating device of the present invention.
Figure 6:
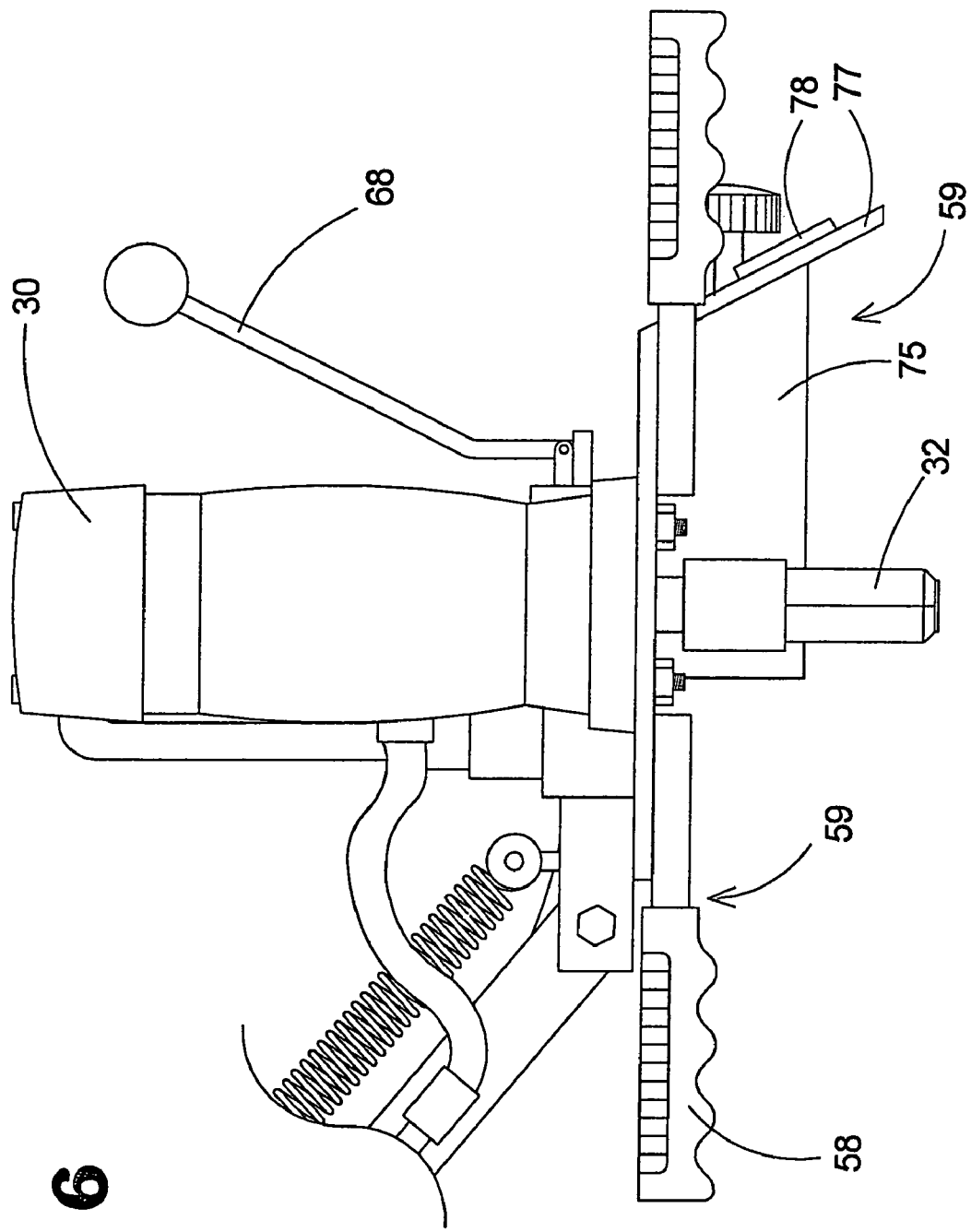
FIG. 6 is a side view of the rotating device of the present invention.

With reference now to the drawings, and in particular to FIGS. 1 through 20 thereof, a new valve tester assembly embodying the principles and concepts of the present invention and generally designated by the reference numeral 10 will be described.

As best illustrated in FIGS. 1 through 12, the valve tester suspension assembly 10 generally comprises an articulated arm assembly 20 designed for coupling to a vehicle 2. A hydraulically powered rotating assembly 30 is pivotally coupled to the arm assembly 20 such that the rotating assembly 30 is positionable in a substantially horizontal orientation at a selectable position in a three dimensional space adjacent the vehicle 2. A shaft 12 is provided having a first end 13 operationally couplable to the rotating assembly 30 for rotating the shaft 12. Typically, the shaft has a receiving portion having a geometric cross-sectional shape for receiving a protrusion 32 rotated by the rotating assembly 30. An adapter 28 is attachable to the protrusion 32 to permit exercising of fire hydrant valves. Alternately, the protrusion may include a geometric cross-sectional receiver portion for engaging fire hydrant valves and the shaft may be shaped to engage the receiver portion of the protrusion.

The arm assembly includes a first arm portion 22 designed for coupling to the vehicle 2 by means such as a hitch on the vehicle. For the purposes of this application, the term vehicle is specifically intended to include any device or structure for transporting persons or things thereby including direct connection to a trailer supporting a hydraulic power source. The arm assembly further includes a second arm portion 24 pivotally and rotatably coupled to a distal end 23 of the first arm portion 22. The arm assembly 20 includes a third arm portion 26 pivotally coupled to a distal portion 25 of the second arm portion 24.

In an embodiment, a first biasing assembly 40 is coupled between the first arm portion 22 and the second arm portion 24. A second biasing assembly 42 is coupled between the second arm portion 24 and the third arm portion 26. A third biasing assembly 44 is coupled between the third arm portion 26 and the rotating assembly 30.

To achieve the pivotal and rotatable coupling between the first and second arm portions, the first arm portion has a pivoting connection portion 16. The second arm portion is pivotally coupled to the connection portion 16. Connection portion 16 further includes an extension portion 79 that extends back adjacent to a main portion 15 of first arm portion 22 when the main portion 15 and the connection portion 16 are positioned in alignment with each other. Biasing means 40 is coupled to the extension portion 79 such that biasing means 40 pivots with second arm portion 24 when connection portion 16 pivots.

Figure 7:
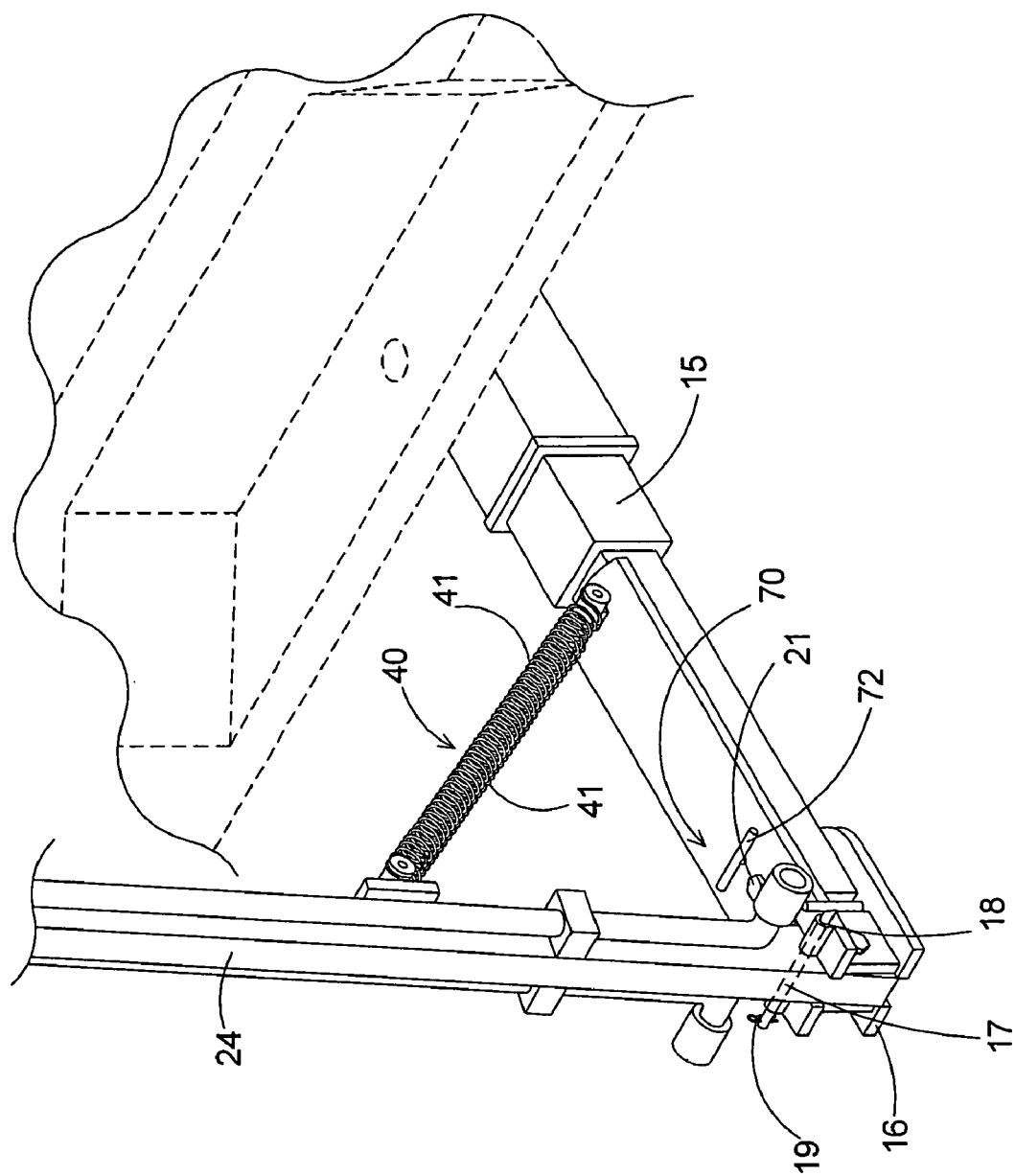
FIG. 7 is a perspective view of a proximal portion of the articulated arm of the present invention.
Figure 8:
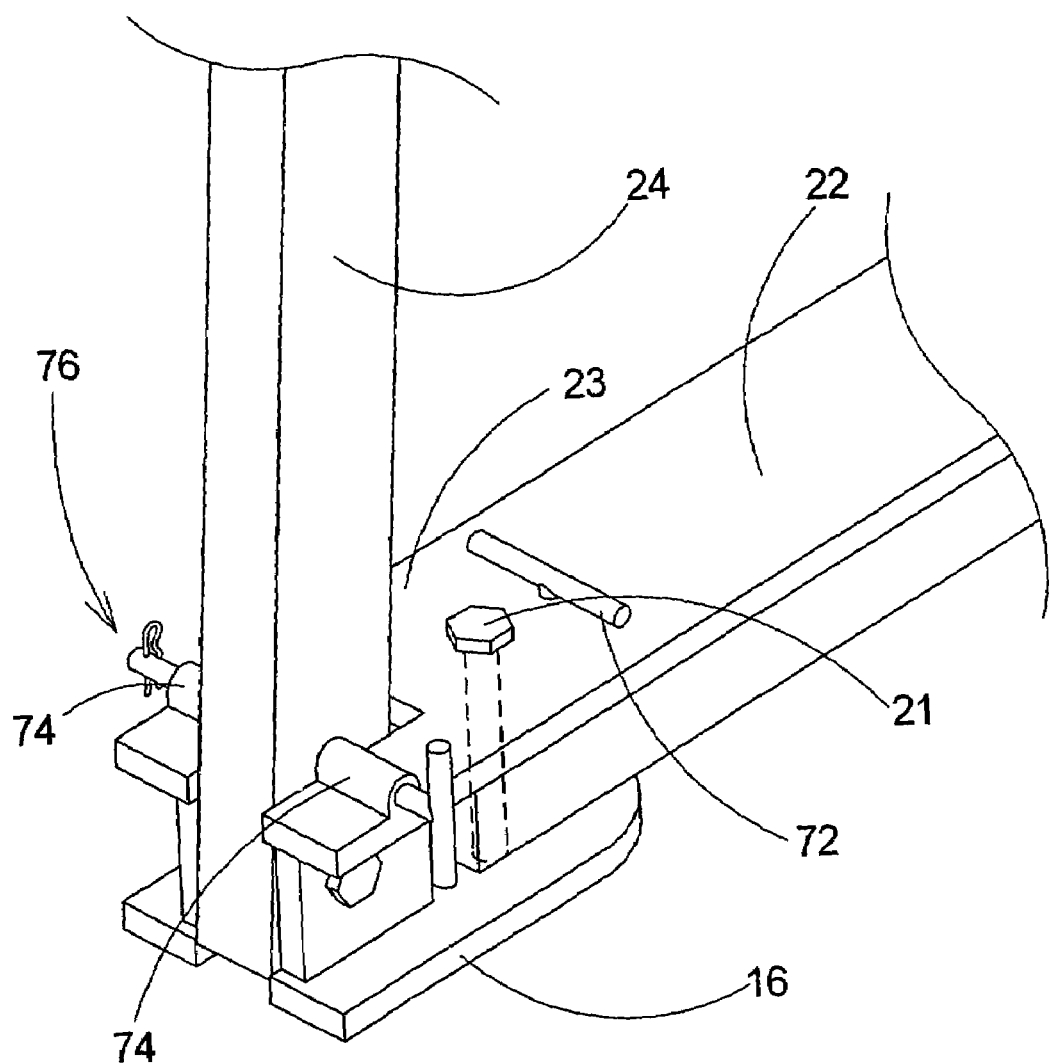
FIG. 8 is a perspective view of a locking means of the present invention.
Figure 9:
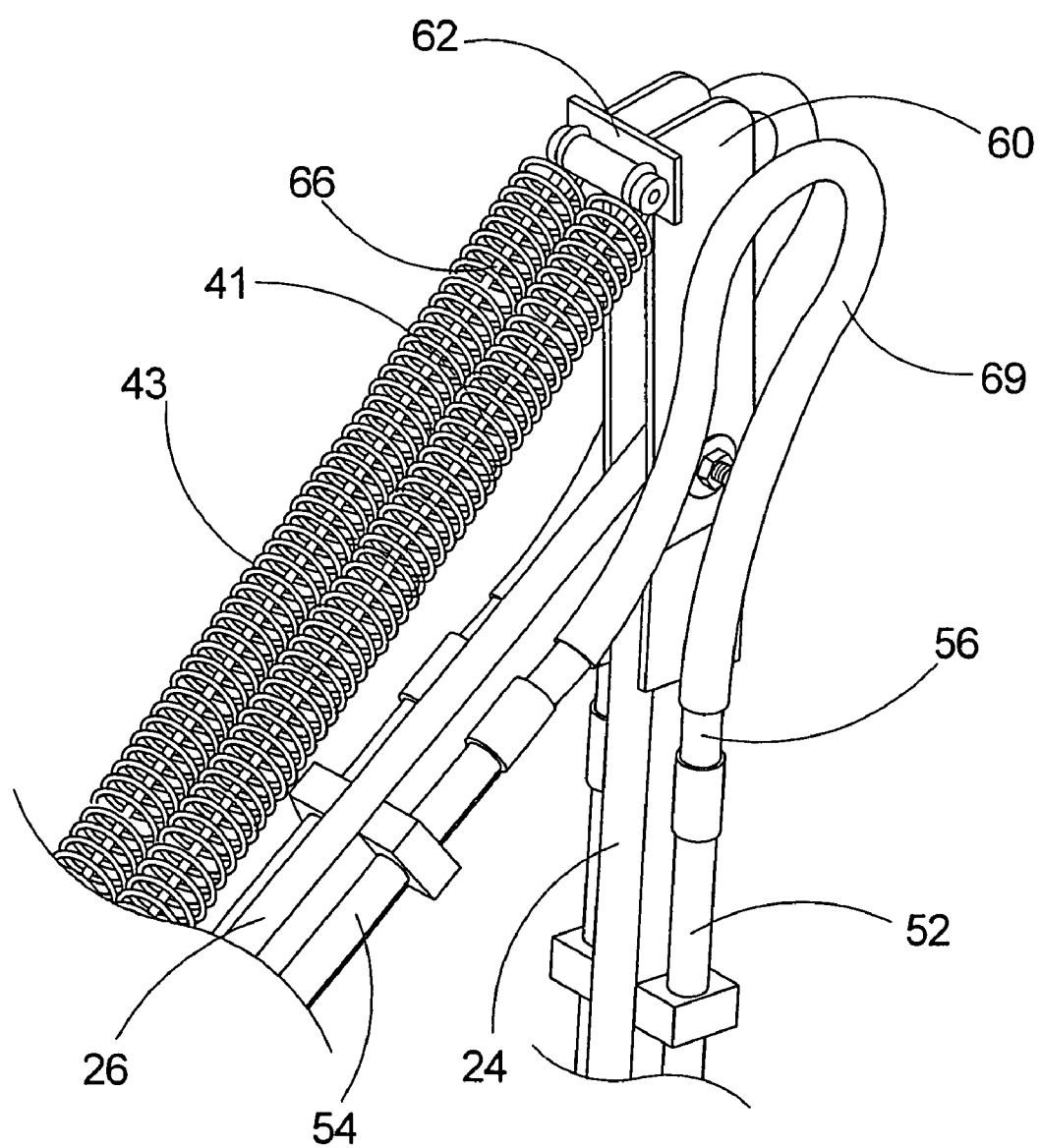
FIG. 9 is a perspective view of a medial portion of the articulated arm of the present invention.
Figure 10:
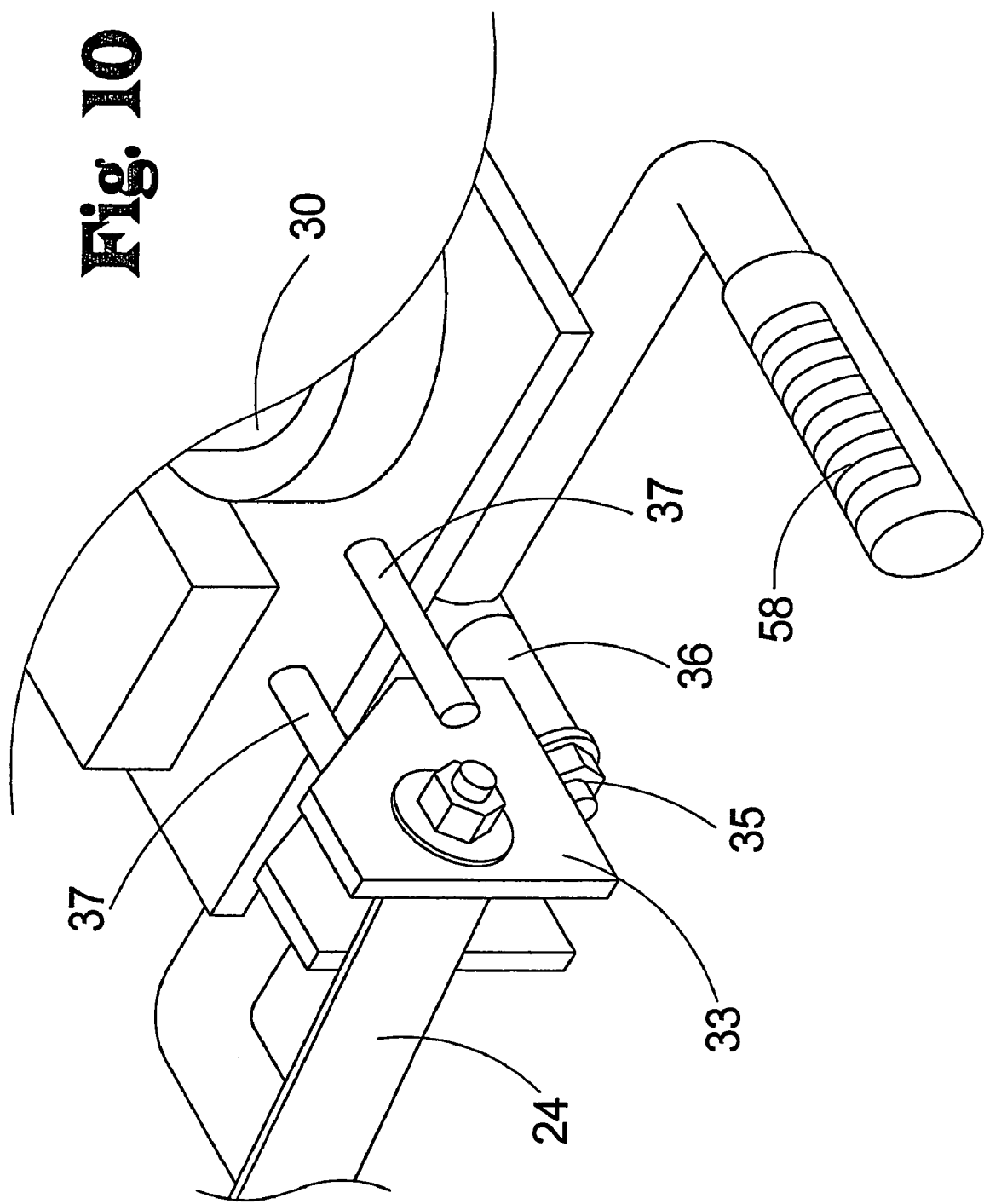
FIG. 10 is a perspective bottom view of an embodiment of the invention.

Hydraulic supply line assemblies 50 are coupled to the arm assembly 20 for providing hydraulic power to the rotating assembly 30. Each hydraulic line assembly includes a first fixed portion 52 coupled to the second arm portion 24. Each hydraulic line assembly 50 further includes a second fixed portion 54 coupled to the third arm portion 26. Each hydraulic line assembly 50 includes a flexible portion 56 coupling the first fixed portion 52 to the second fixed portion 54. A protective covering 69 is coupled to the flexible portion 56 of each hydraulic line assembly 50. Each second fixed portion 54 is operationally coupled to a respective one of an input and an output on the rotating assembly such that each of the hydraulic line assemblies forms either an inlet line or an outlet line. The connectors, as shown in FIG. 7, are differentiated to insure the inlet line and the outlet line are not reversed when connecting the invention to an auxiliary hydraulic power unit.

In the biased embodiment, the first biasing assembly 40 is a pair of first biasing assembly spring members 41 and the second biasing assembly 42 is a pair of second biasing assembly spring members 43. Each of the second pair of second biasing assembly spring members 43 is coupled between a distal end 60 of an extension portion 62 of the second arm portion 24 and a medial portion 64 of the third arm portion 26. Extension portion 62 may be a separate piece attached to second arm portion 24 or may be an integral extension of second arm portion 24. The third biasing assembly 44 is a single third biasing assembly spring member 45.

To enhance the safety of the biased embodiment in the event of catastrophic failure of a spring member, each spring member of the first, second and third biasing assemblies has a respective elastic core member 66 extending through the spring member.

A hydraulic control mechanism 68 is coupled to the rotating assembly 30 for facilitating user operation of the rotating assembly 30. Corresponding to the currently used practice for testing underground valves, a counter 38 is coupled to a display flange 77 of the rotating assembly 30 for counting rotations of the shaft 12. Additionally, a torque indicator gauge 78 is operationally coupled to the rotating assembly to indicate torque on the rotating assembly. This provides a new method of testing alternative to counting rotations of the shaft. A torque adjustment means 75 is operationally coupled to the rotating assembly for adjusting the amount of torque applied by the rotating assembly 30 to prevent overstressing of the valve assembly being exercised.

A first locking means 70 is provided for locking the second arm portion 24 from rotating relative to the first arm portion 22. A second locking means 76 is provided for locking the second arm portion 24 from pivoting relative to the first arm portion 22.

The first locking means 70 is a pin 72 insertable through the first arm portion 22 and the connection portion 16 in spaced relationship to a rotational pivot point 21 of the connection portion 16. Thus, the connection portion 16 is held in position by pin 72.

Figure 11:
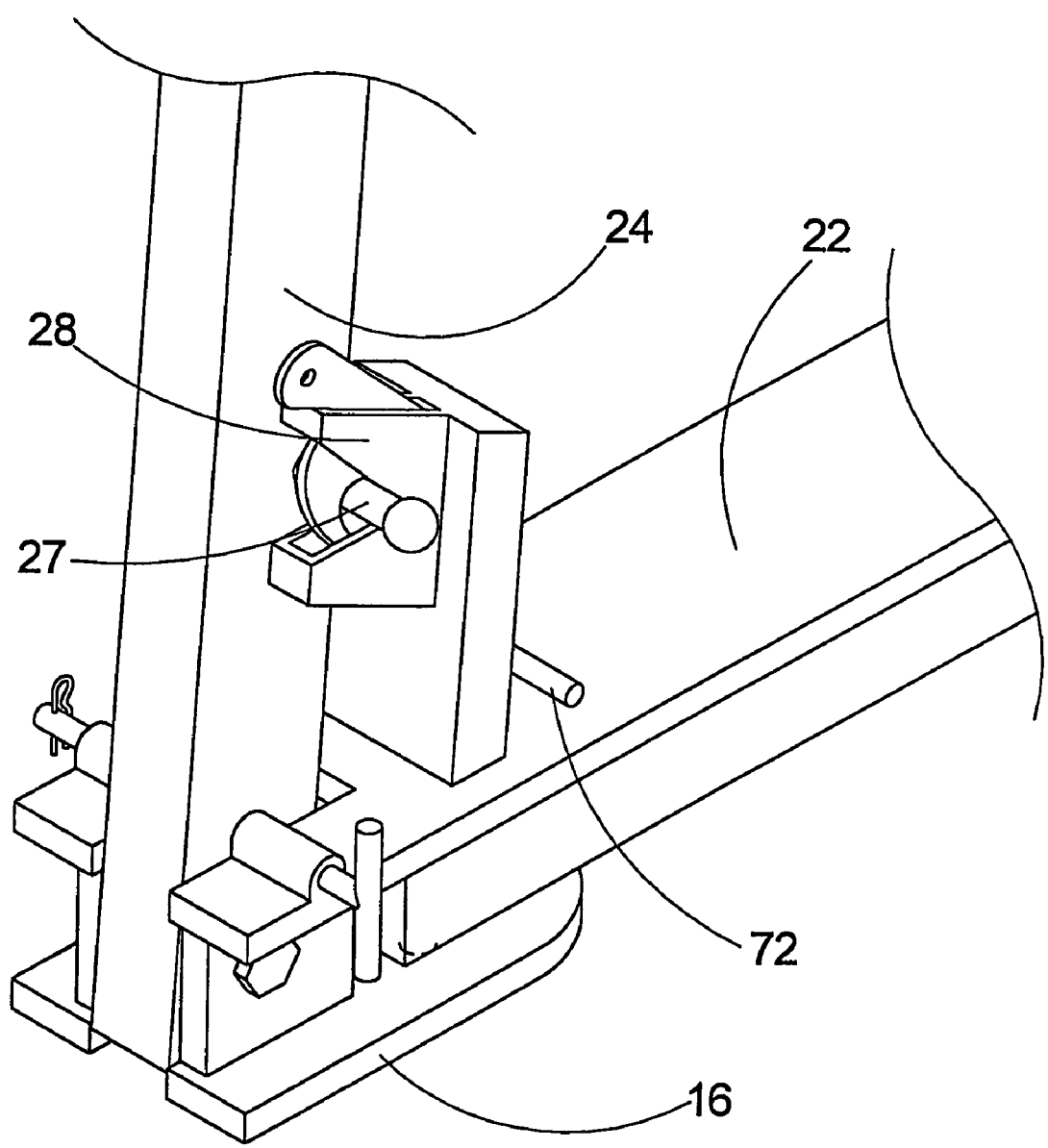
FIG. 11 is a perspective view of an alternate locking means for the articulated arm assembly.
Figure 12:
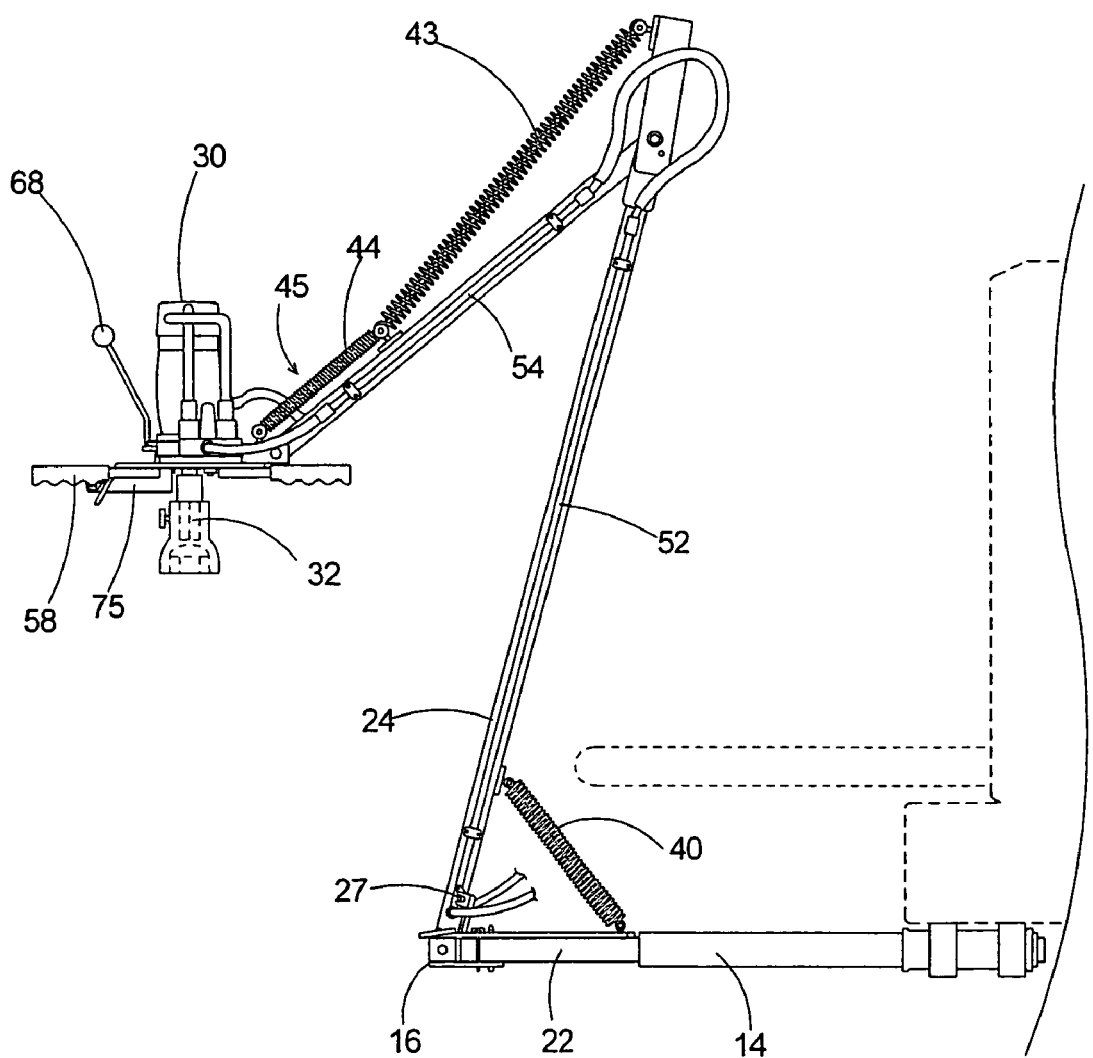
FIG. 12 is a side view of the present invention in a retracted position.
Figure 13:
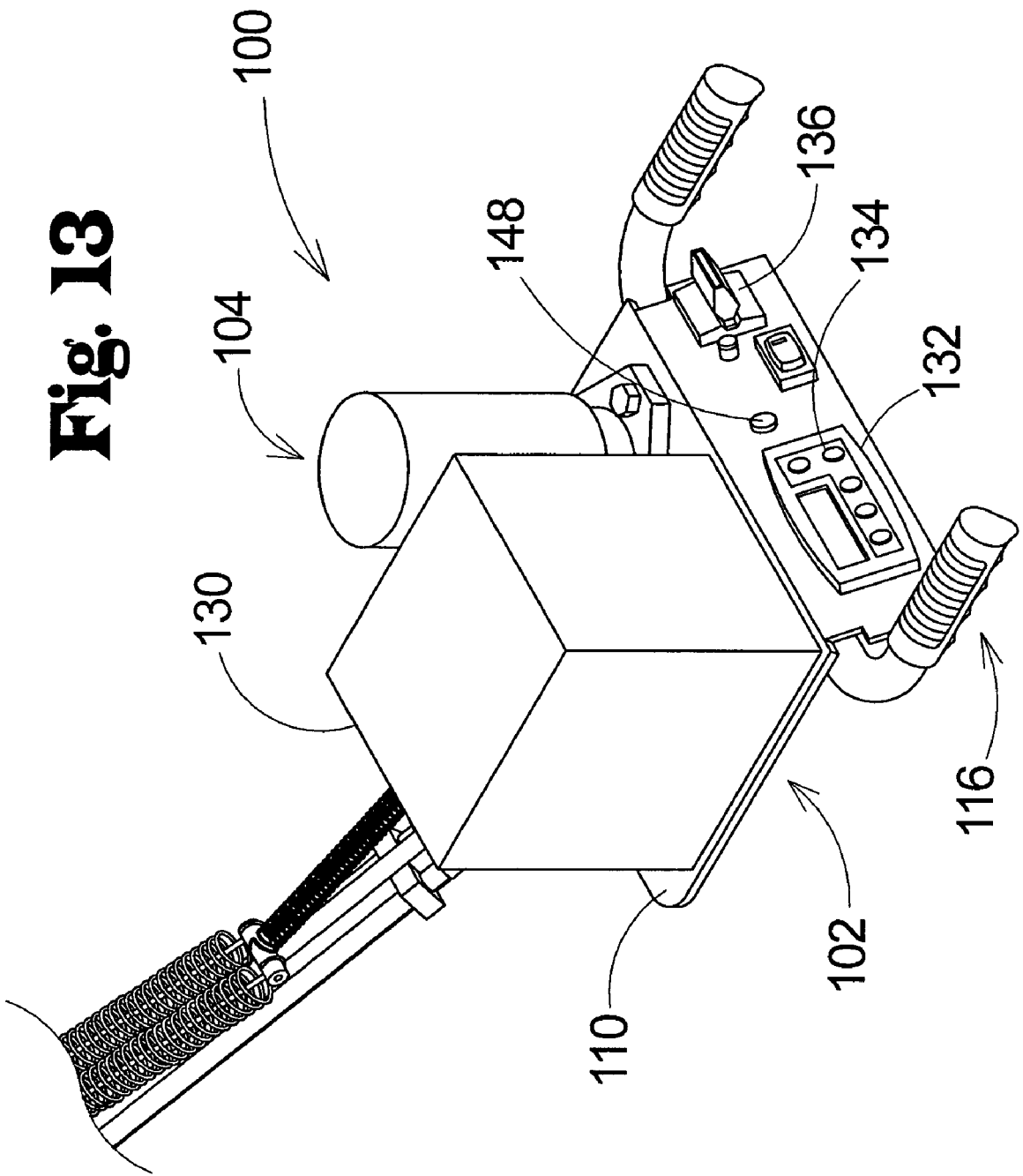
FIG. 13 is a schematic perspective view of a valve tester apparatus of the present invention with optional control functions.
Figure 14:
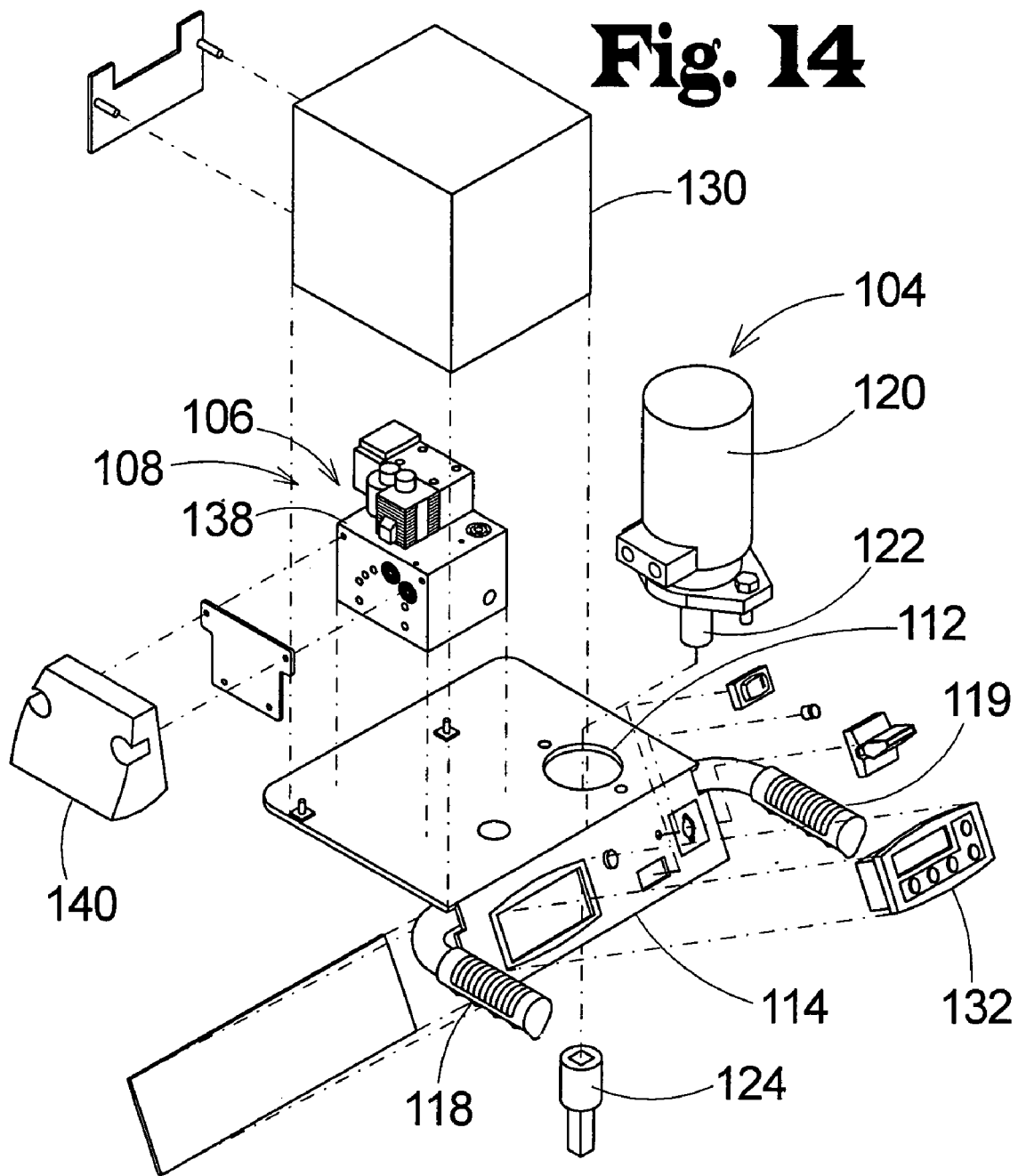
FIG. 14 is a schematic exploded perspective view of the valve tester apparatus of FIG. 13.
Figure 15:
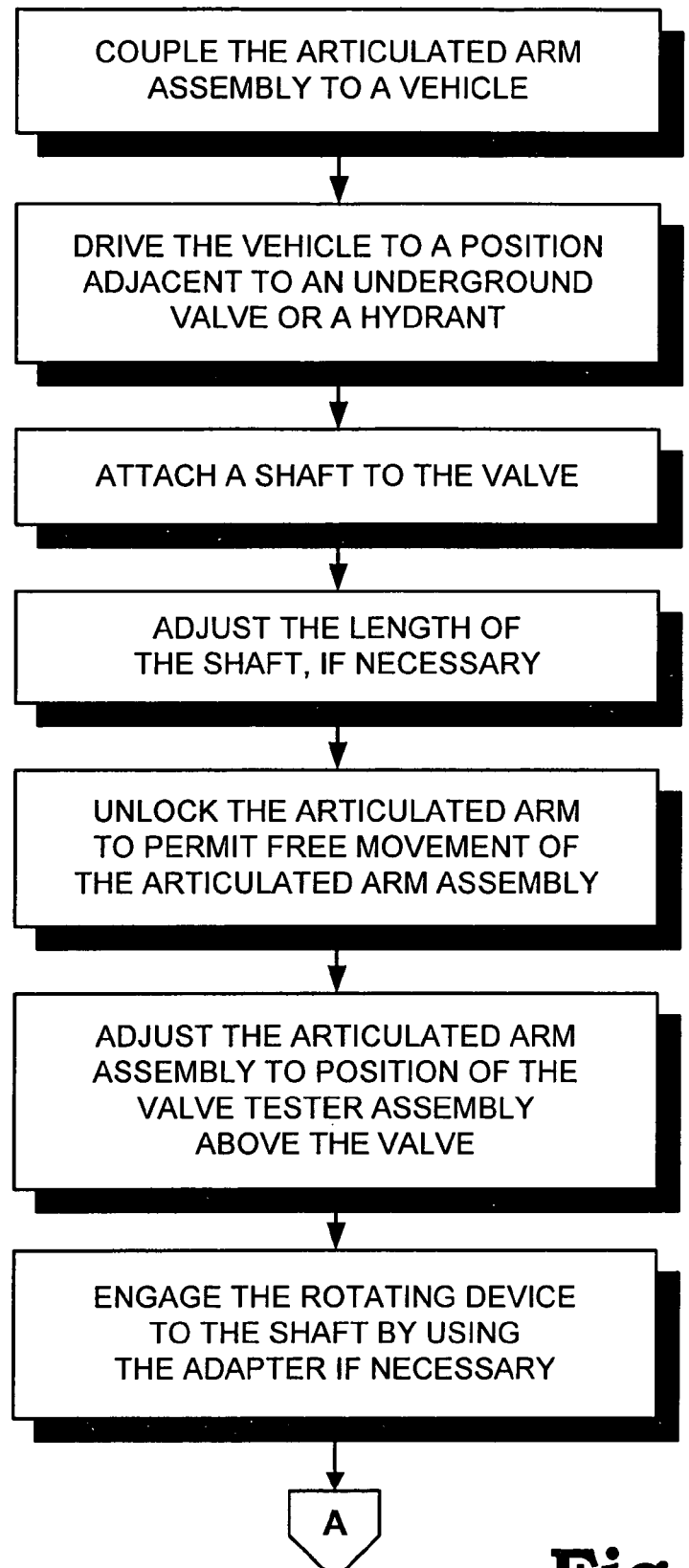
FIG. 15 is a flowchart depicting a first aspect of a process for testing a valve using the valve tester assembly of the present invention.
Figure 16:
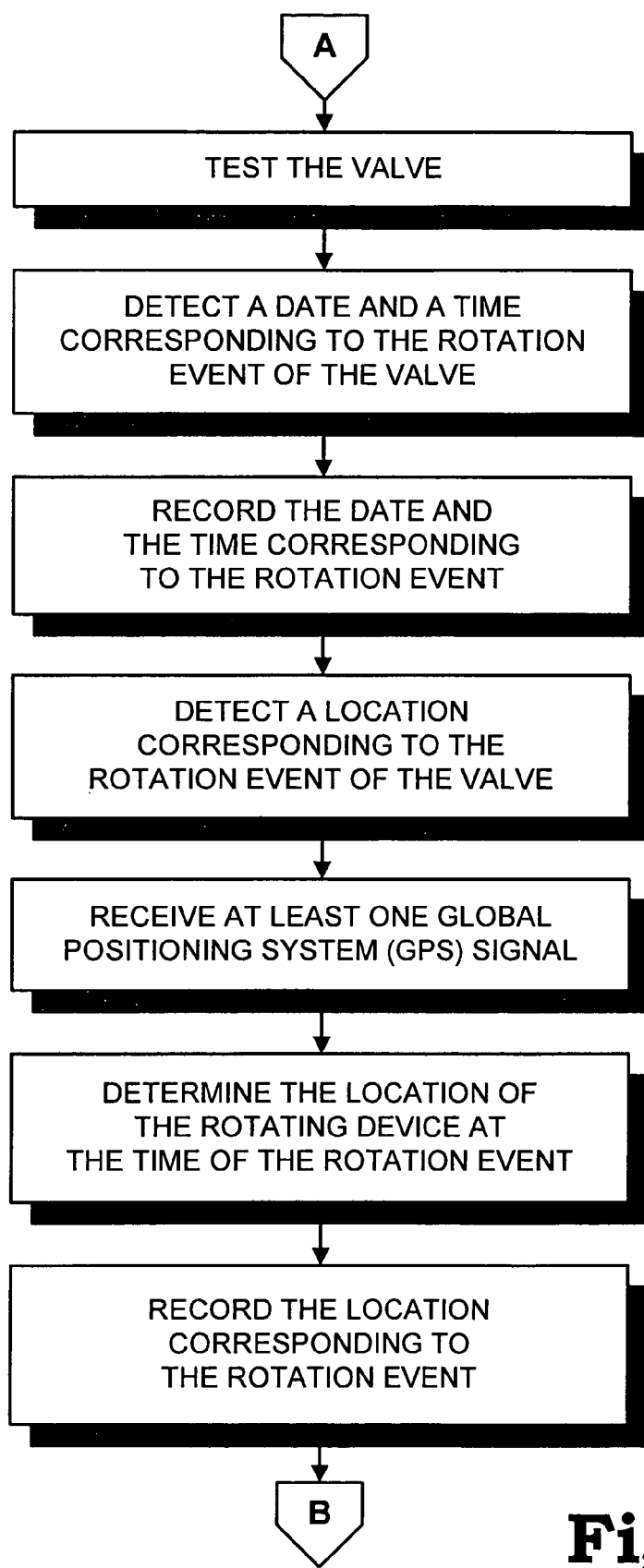
FIG. 16 is a flowchart depicting a second aspect of a process for testing a valve using the valve tester assembly of the present invention.
Figure 17:
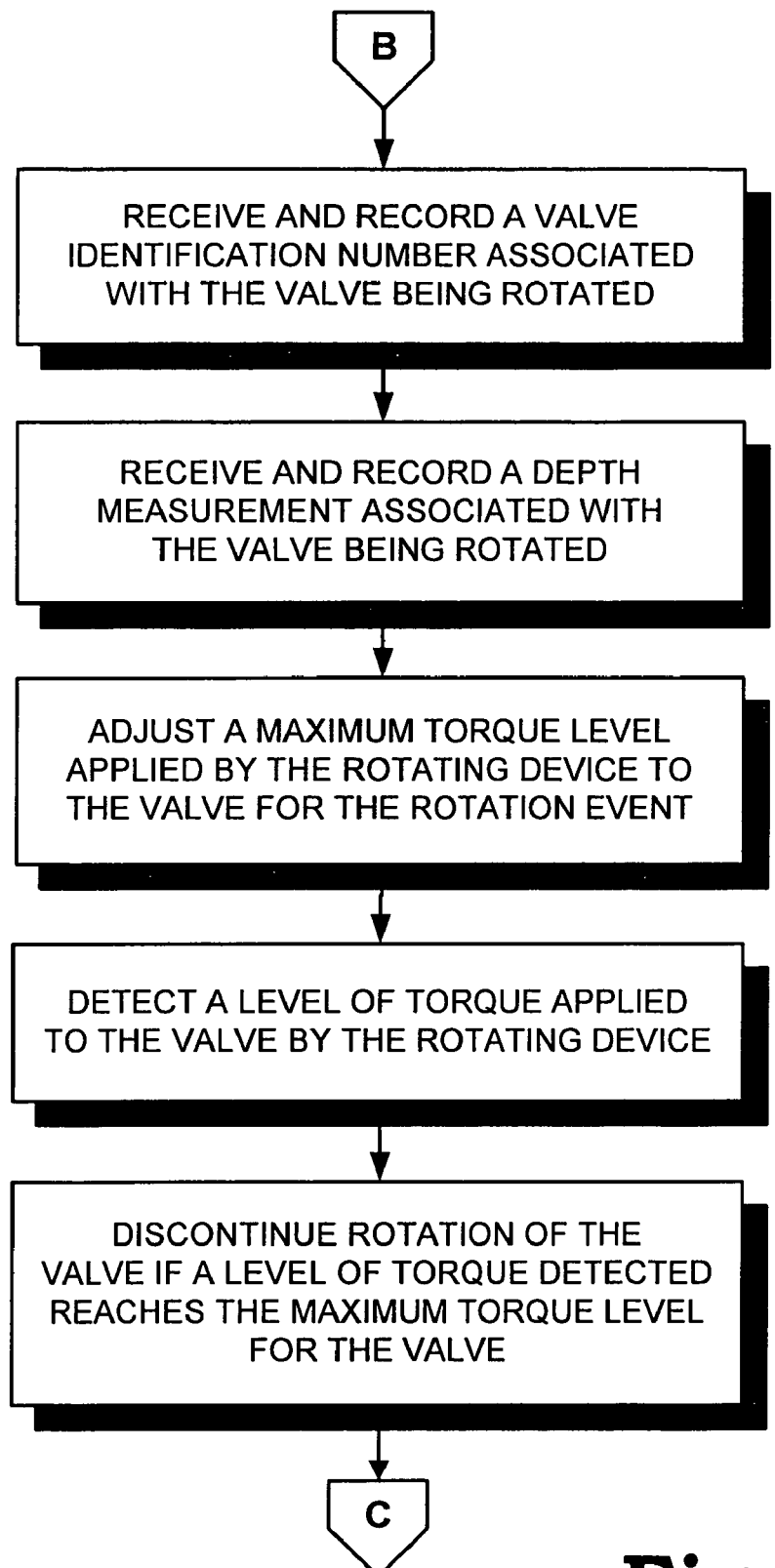
FIG. 17 is a flowchart depicting a third aspect of a process for testing a valve using the valve tester assembly of the present invention.
Figure 18:
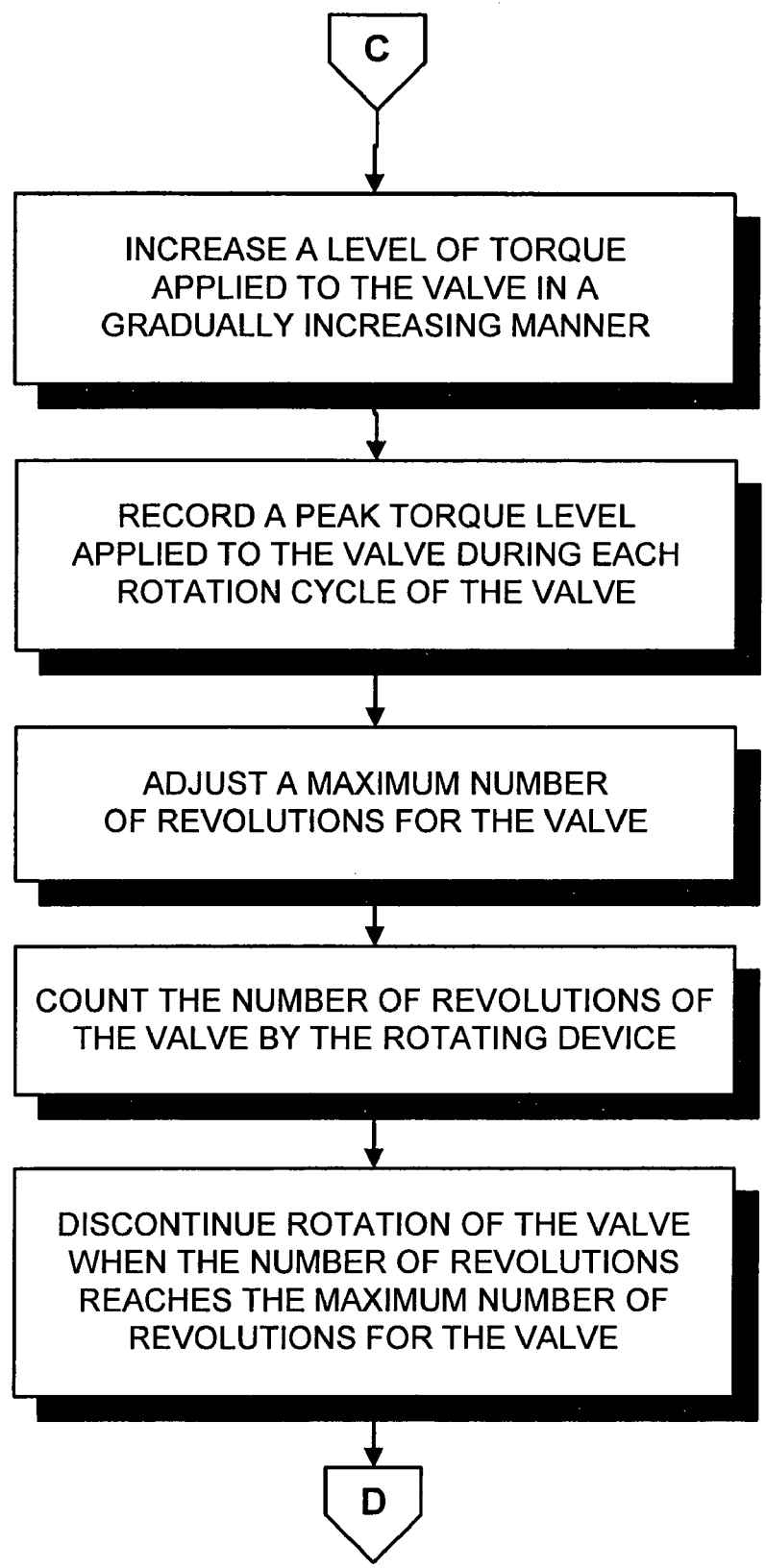
FIG. 18 is a flowchart depicting a fourth aspect of a process for testing a valve using the valve tester assembly of the present invention.
Figure 19:
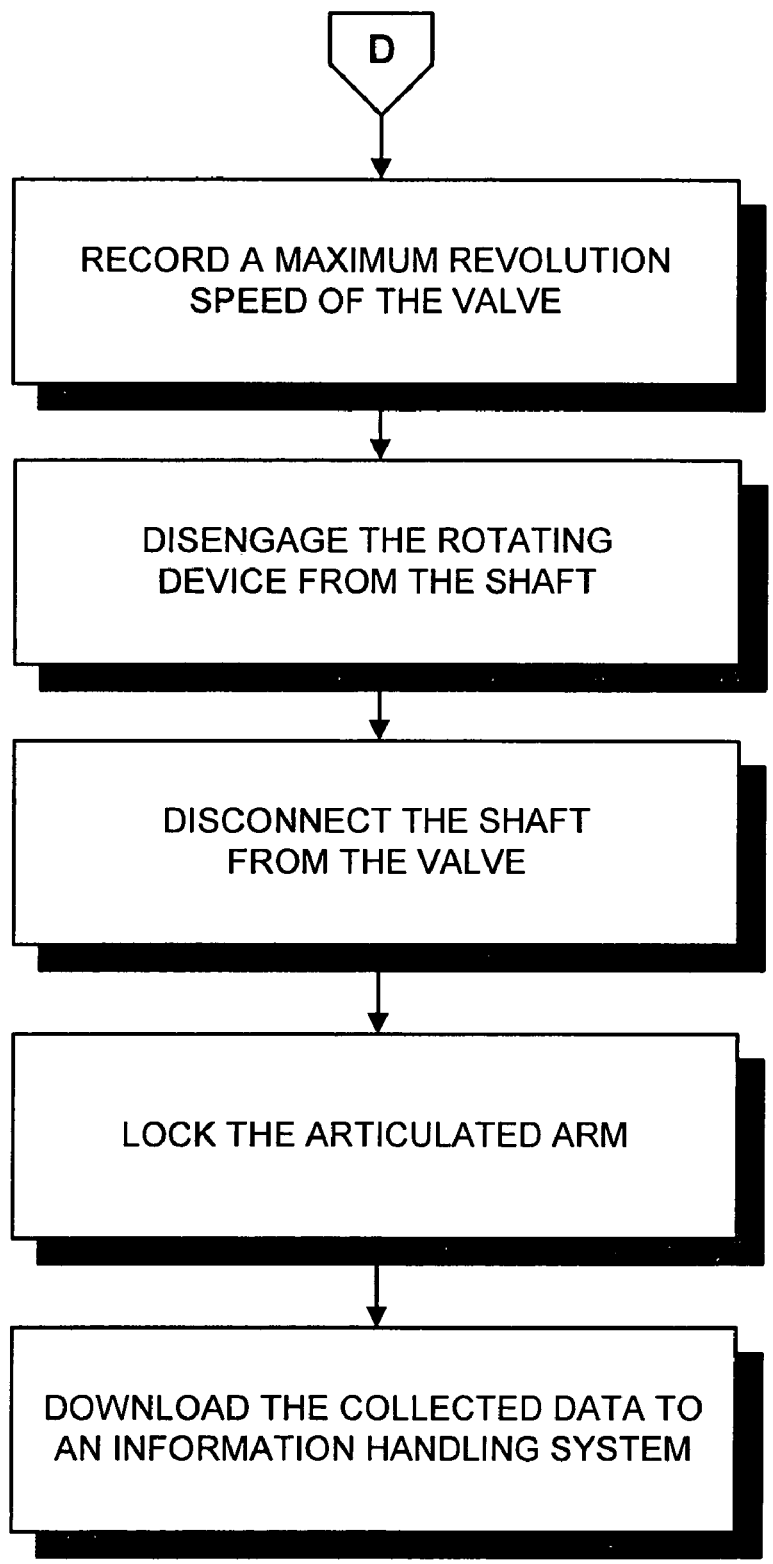
FIG. 19 is a flowchart depicting a fifth aspect of a process for testing a valve using the valve tester assembly of the present invention.

The second locking means 76 includes a pair of aligned holed flanges 74 in the connection portion 16 of the first arm portion 22. The second arm portion 24 includes a locking aperture 17 alignable with holes 18 in the flanges 74. A locking pin 19 is insertable through the aligned holes 18 and aperture 17 whereby the second arm 24 is prevented from pivoting relative to the connection portion 16 of the first arm portion 22. Additionally, in an embodiment, the second locking means 76 may be a locking bar 27 extending from the second arm portion 24 for engaging a latch member 28 fixedly coupled to the first arm portion 22 as shown in FIG. 11. The locking bar and latch member may be used alone for securing the arm assembly during relatively short trips between valve sites or in combination with the locking pin 19 and aligned holes 18 for maximum stability as desired. The invention may include either one of the above described locking structures or both in combination as each provides unique advantages.

Optionally, an extension member 14 is couplable between the articulated arm assembly 20 and the vehicle 2 for spacing the second arm portion 24 from the vehicle 2 to permit free movement of the second arm portion 24 when a tailgate of the vehicle is in an open position.

A plurality of handles 58 are coupled to the rotating assembly 30 for facilitating grasping and movement of the rotating assembly 30. The handles 58 are being arranged to form two opposing handle pairs 59. The handle pairs 59 are substantially aligned with respect to each other.

In an embodiment, the rotating assembly 30 is coupled to the articulated arm assembly such that the rotating assembly is pivotable around a horizontal axis to permit positioning of the rotating assembly 30 in a desired position to engage valves that are not in perfect horizontal alignment such that the shaft is in a non-vertical position when engaged to the valve. The coupling of the rotating assembly 30 is achieved by having a post 35 extend from the rotating portion. A rotating assembly connection member 33 includes a bearing portion 36 secured to the post 35 and a pair of limiting bars 37 that extend out from the rotating assembly connection member 33 to contact the rotating assembly to limit the pivoting range of the rotating assembly around the horizontal axis.

In use, the articulated arm assembly is coupled to a vehicle using a conventional hitch mounted anywhere on the vehicle including the front or back. The vehicle can be driven to a position adjacent an access port in the road that gives access to an underground valve. The invention permits positioning of the vehicle anywhere within a range of the access port so that the vehicle does not have to be moved to precisely align the rotating device with the access port. Typically, the valve being tested is positioned a distance beneath the road, often 4 to six feet. A shaft, which may have an adjustable length either by being telescopic or having a one or more extension pieces, is engaged to the valve. The articulated arm is unlocked to permit free movement of the arm by a single person. The rotating device, typically a heavy hydraulically powered device, is then grasped and may be positioned by a single person.

When the biasing assemblies are used the weight of the rotating device is partially supported by the biasing in the articulated arm. Adjustments to the amount of support can be achieved through the use of multiple interchangeable springs or other known methods of varying the resistance of a biasing member.

The pivoting of the articulated arm permits movement of the rotating device within a three dimensional space while holding the rotating device in the necessary substantially horizontal orientation. Additional pivoting of the rotating device is provided to facilitate attachment of the rotating device to shafts when the shaft is slightly off vertical orientation as may happen when the valve is in a slightly tilted position. The rotating device can be positioned immediately over the shaft and then lowered to engage the shaft. The rotating device remains in engagement with the shaft by the residual weight of the rotating device not supported by the articulated arm or the user. The user may also push downwardly on the rotating device during use if desired or otherwise deemed necessary.

Typically, the testing is done by loosening and re-tightening a number of rotations. In an embodiment, a counter is used to count the number of rotations to facilitate the current testing methods. Alternately, torque measurement style testing is now facilitated by the present invention if the invention is equipped for measuring or responding to pre-determined torque conditions during rotation. Upon completion of the testing, the rotating device is disengaged from the shaft and the articulated arm returned to a storage or retracted position and then locked into place to permit safe movement of the vehicle to the next testing place. This new method provides a significant increase in efficiency allowing many more valves to be tested in a given amount of time.

Through use of the adapter described above or through integral shaping of the protrusion of the rotating device, the rotating device may also be engaged to fire hydrant valves as desired.

In an embodiment of the invention that includes variations that may be employed with the above-described elements of the invention, a valve tester assembly 100 is provided that includes a support 102 that may be mounted on the previously described articulated arm assembly 20, a motor assembly 104 acting as a means for rotating the valve stem, a hydraulic fluid control device 106 for controlling fluid flow to the motor assembly 104, and a controlling assembly 108 for controlling the hydraulic fluid control device and detecting and recording various aspects of a valve rotation event by the valve tester assembly 100.

The support 102 of the valve tester assembly 100 may include a platform 110 that has a top and a bottom according to the normal orientation of these features of the platform 110 when the valve tester assembly is in a normal use position and the platform is oriented in a substantially horizontal plane. The platform 110 may have an aperture 112 extending between the top and bottom. The support 102 may also include a control panel 114 for supporting various controls of the valve tester assembly 100. The control panel 114 may extend from the platform 110 in an outwardly and downwardly direction from the platform so that the control panel is inclined toward a position of a user operating the valve tester assembly 100. The support 102 may further include a handle structure 116 that is mounted on the platform 110, and may include a pair of handles 118, 119 that extend adjacent to the control panel 114. (Additional handles may also be provided, as shown in FIG. 1.) Each handle 118, 119 of the pair of handles may be positioned on opposite ends of the control panel 114, and may extend in substantially the same direction from the platform 110 to be grasped by the hands of the operator during the valve rotation event, while keeping the hands of the operator proximate to the controls on the valve tester assembly for periodic adjustment as needed.

The motor assembly 104 of the invention is provided for rotating the shaft 12 to exercise a valve engaged by the shaft. The motor assembly 104 is generally positioned on the support 102, and includes a motor 120 which is preferably hydraulically powered motor, but could be powered by other means. The motor 120 may be mounted on the platform 110 at a location on the top of the platform. A rotatable shaft 122 extends from the motor 120, and preferably extends through the aperture 112 in the platform 110. The motor assembly 104 may include a shaft coupler 124 that is mounted on the rotatable shaft 122, and that includes a cavity for receiving an upper end of the shaft 12. The motor assembly 104 may include a rotation sensor 128 (not shown) that is mounted on the support 102 and a magnet (not shown) that is mounted on the shaft coupler 124. The rotation sensor is positioned adjacent to the shaft coupler 124 such that rotation of the shaft coupler moves the magnet past the rotation sensor as the shaft coupler is rotated.

The support 102 may also include a housing 130 that is mounted on the platform 110. The housing 130 may be positioned on the top of the platform 110, and may form an enclosure for various elements of the valve tester assembly, including the hydraulic fluid control device and the controlling assembly.

The hydraulic fluid control device 106 of the invention may comprise a valve assembly 138 that controls the flow of hydraulic fluid to and from the motor 120, and may control the flow of the fluid to the motor in a manner that permits the motor to rotate in two opposite rotational directions (e.g., clockwise and counterclockwise). The valve assembly 138 may also serve to control the speed of the rotation of the motor 120 during the valve rotation event, as well as the rotational force applied by the motor to the valve during the valve rotation event. In the most preferred embodiments of the invention, the valve assembly 138 comprises an assembly of a plurality of valves that are integrated together into a single unit, and may include a valve for controlling the volume of flow through the valve assembly 138 to control the speed of rotation to be applied to the valve to be tested, a valve for controlling the pressure of flow through the valve assembly 138 to control the rotational force applied to the valve to be tested, and a valve for controlling the direction of flow through the valve assembly 138 to control the direction of rotation of the valve to be tested.

Optionally, the hydraulic fluid control device 106 may also include means for sensing the pressure of the hydraulic fluid supplied by the hydraulic pump to the motor 120 and also means for sensing the flow rate of the hydraulic fluid supplied by the hydraulic pump to the motor 120.

The controlling assembly 108 of the valve tester assembly 100 may include a display 132 for conveying information to the operator of the valve tester assembly 100. The display 132 may comprise a liquid crystal display (LCD) screen, or even a light emitting diode (LED) array although such is not as preferred as the LCD screen. For example, the information that may be displayed on the screen of the display may include the value of the rotational force currently being applied to the valve being tested, the number of revolutions that the valve has been turned, and this information may be conveyed in an alphanumeric form or a graphical form, or a combination of both forms.

The controlling assembly 108 may include a number of manual or hand-operated controls 134 for permitting the operator to control and adjust the operation of the motor 120 through, for example, the operation of the valve assembly 138. The controls 134 may be embodied in any suitable form, such as, for example, buttons, toggle switches, blister switches, and the like. Illustratively, the controls 134 may include a switch 136 for changing the rotational direction of the motor 120, a switch for adjusting the speed of the rotation of the valve being tested, and a switch for adjusting the rotational force being applied to the valve being tested. The controls 134 may include a switch dedicated to each of these functions, switches that control a number of these functions. Other suitable switches may be provided, for example, to control various parameters of the rotation event testing or to enter information into the valve tester assembly 100.

Figure 20:
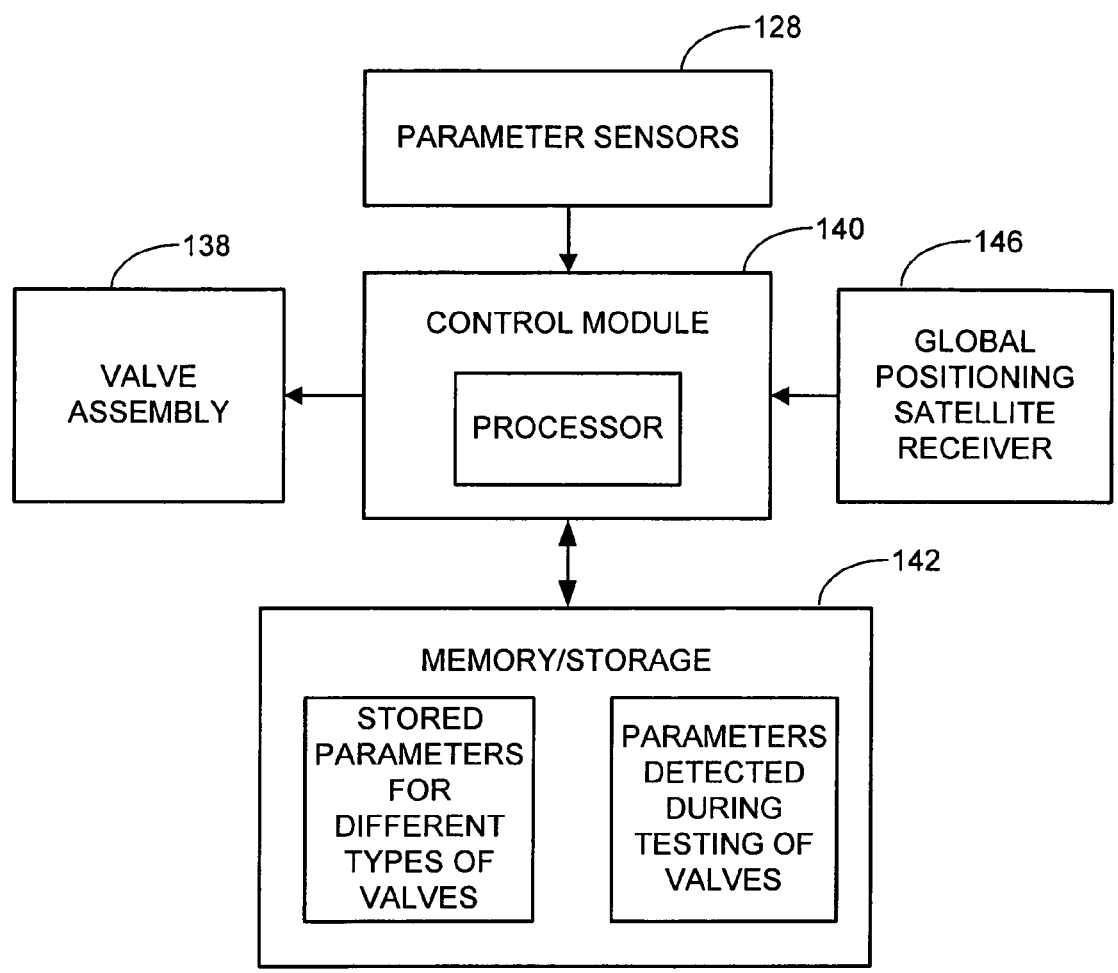
FIG. 20 is a schematic block diagram of various functional components of the present invention.

The controlling assembly 108 may also include a control module 140 for performing a number of control functions for the valve tester assembly, including control of the motor 120 through the hydraulic fluid control device 106 (see FIG. 20). The control module 140 may include a programmed or programmable logic processor, or other processing or control device suitable for administering the functions that need to be controlled and the information that is stored.

The controlling assembly 108 may also include memory or storage 142 that is in communication with the control module 140. In the most preferred embodiments of the invention, the memory 142 performs two functions, although one of these functions may be omitted, or additional functions may also be performed by the memory 142. Preferably, the memory 142 includes some type of non-volatile, or persistent, storage device to retain data during times when the controlling assembly 108 is powered down. Optionally, the memory 142 may also include volatile memory.

One of the primary functions of the memory 142 is to store a number of parameters for a range of different valves that may be encountered during testing of valves in a political division, such as a municipality. The different valves may be differentiated according to, for example, the type, size, brand, or manufacturer (among other aspects) of the valve. The information associated with each type of valve may include, for example, maximum parameters of rotational force, revolutions, and speed applicable to a given type of valve. Preferably, this information about the valves is preprogrammed into the memory 142, and cannot be readily altered, but it is within the spirit of the invention that this data may be capable of periodic updating with revised information or new information. Another primary function of the memory 142 is to store specific information about parameters that are detected or measured during rotation events of each of the valves that may be exercised by the operator of the valve tester assembly over a period of time, such as, for example, a day or a week. This specific information may then be subsequently downloaded to a database that retains more permanent records of the rotation events for a plurality of valves in the political division. This episodic data may be automatically recorded in the memory 142 by the processor of the control module 140 as the rotation event is occurring, and then downloaded at a later time.

The control module 140 may be configured or programmed to perform a number of functions with respect to the elements of the valve tester assembly 100, to thereby control and detect a number of aspects or factors of a particular rotation event associated with a particular valve. These aspects or factors may be controlled, and in some cases measured and recorded, by the control module, for establishing a record of the particular rotation event to be recorded in the memory 142 for being subsequently downloaded or otherwise transferred from the assembly 100 to a more permanent storage facility. This information may be stored in the memory for downloading directly to a computing device, or to a storage device (with no computational capability), upon connection of the valve tester assembly to such devices through a communication port 148. Importantly, it is desirable that the control module 140, and the valve tester assembly 100 as a whole, be operable for rotating and testing a valve in the manner described, without having to be connected to any external device while the rotation event is being performed. As a result, the assembly 100 is essentially self contained and operable without such external connection, and only needs to be connected, either through wired or wireless means, to download data that has been collected during various valve exercising events. There is one significant exception to this general feature of the invention that will become apparent as this description proceeds.

One of the parameters of the rotation event that may be detected is the current date and current time, so that the date and the time corresponding to the rotation event of the valve may be established. The control module 140 may be configured to detect the current date and time of the rotation event. Optionally, this function may be performed by a timekeeping clock in the control module 140, or may be performed by the location detecting circuitry discussed below. Once detected, the date and the time corresponding to the rotation event may be recorded in the memory 142.

In a highly significant aspect of the invention, the control module 140 may be configured to detect a location of the valve tester assembly 100, and thus the valve being exercised, during a particular rotation event of the particular valve. The capability to determine the precise location of the valve being tested is primarily directed to ensuring the accurate identification of the valve being tested during a rotation event so that the information about the rotation event being performed is associated with the correct valve, and not with another valve. However, this capability may also be employed to help create a highly accurate map of existing valves for producing a database or map of the valves within a particular geographical area, especially where no map may have previously existed, or may have been inaccurate or generalized in identifying location. This capability can eliminate the need for the operator in the field to associate the valve being tested (and the data associated with the rotation event) with a valve identification number on a map, thus reducing the likelihood of errors in this aspect of the testing procedure. This capability of the invention may also serve to notify the operator prior to the beginning of the rotation event that the wrong valve is being tested if the known location of the valve does not match the location being detected by the valve tester assembly 100. It may also assist the operator in locating the valve, if the operator is able to read the tester location coordinates from the tester assembly and match them with coordinates on a list.

In a highly preferred embodiment of the invention, the location information or data may be supplied by a receiver 146 receiving location signals from the Global Positioning Satellite (GPS) system. In one embodiment of the invention, the GPS receiver 146 for receiving the GPS signals from the various satellites is integrated into the valve tester assembly 100, and is in direct communication with the control module 140 without any operator intervention to achieve this communication. However, in other embodiments of the invention, the GPS receiver 146 is a unit that is separate (or separable from) the valve tester assembly 100, and is connectable to the control module 140 through a data transmission interface or port 148 to transfer the location information to the control module 140 for recording in the memory 142. The interface may comprise, for example, a Universal Serial Bus (USB) jack, but may include any other suitable proprietary or standardized interface capable of linking the GPS receiver 146 to the control module 140 ands transferring the relevant data.

The control module 140 may be further configured to receive and record a valve identification number associated with the valve. This identification number may be entered by the user performing the valve rotation event, or may be provided by a pre-selected or preprogrammed listing or sequence of valves to be tested. The control module 140 may also be configured to receive and record a depth measurement associated with the valve, such a depth of the valve below the ground surface. The depth measurement may be entered manually by the operator, or may be input by an automated sensing system.

The control module 140 may still further be configured to adjust a maximum rotational force level that may be applied by the motor to the valve during the rotation event. The value of this maximum rotational force level may be manually entered by the operator of the system, but in a preferred aspect of the invention, this value is preprogrammed into memory and is associated with the type (e.g., by brand, manufacturer, and/or size) of the valve that is being exercised, and is called up when the operator identifies (or otherwise indicates) the valve type.

Additionally, the control module 140 of the valve tester assembly 100 may also be configured to detect a level of rotational force that is actually being applied to the valve by the tester assembly during the particular valve rotation event. The control module 140 may also be configured to discontinue rotation of the valve by the motor when it is detected that the level of rotational force applied to the valve during the rotation event reaches the maximum force level for the particular type of valve being exercised. The control module 140 may also be configured to record a peak rotational force level applied to the valve during a rotation event of the subject valve by the motor 120. Optionally, a peak rotational force level for each rotation cycle of the rotation event may be recorded in the memory 142. The control module 140 may be configured to increase a level of rotational force applied to the valve in a gradually increasing manner, which is preferably a ramped, or substantially straight line, increase in the level of force applied.

The control module 140 may perform still further functions. For example, the control module 140 may be configured to adjust the maximum number of revolutions that the valve may be turned by the motor, according to the particular type of valve being exercised during the current rotation event and the parameters stored in the memory 142. The control module 140 may also be configured to count a number of revolutions of the valve by the motor 120 through the magnet and rotation sensor described above. The control module 140 may also be configured to discontinue rotation of the valve by the motor 120 when the count of the number of revolutions reaches the maximum number of revolutions for the valve. The control module 140 may further be configured to detect a revolution speed of the valve during the rotation event, and may also record a maximum revolution speed of the valve in the memory 142.

The control module 140 may be configured to download data collected during the rotation event of one or more valves. The control module 140 may be capable of downloading the collected data to an information handling system having processing capabilities, such as a personal computer, portable/laptop computer, a personal digital assistant, and the like. The control module 140 may be configured to communicate over a data link or cable to send data, including data regarding a valve rotation event, and receive data, such as updated or expanded data regarding acceptable rotation parameters for different types of valves. The data transmitted over the link may thus move to and from the memory 142. Optionally, the control module 140 may be configured to download the collected data to a device lacking any significant processing capability, such as a device containing a memory chip or a miniature disk drive, for example.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, unless particular features are mutually exclusive, all of the various combinations of the features are intended to be encompassed by the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A valve tester system comprising:
    a valve tester assembly for rotating a valve stem of a valve, comprising:
        a support;
        rotation means mounted on the support for rotating a valve during a rotation event;
        control means for controlling aspects of the rotation event of the valve by the rotation means; and
        means for detecting a location of the valve tester assembly during the rotation event of the valve;
        the control means causing the detecting means to detect the location of the valve tester assembly in response to rotation by the rotation means.

2. The valve tester system of claim 1 wherein the means for detecting the location of the valve tester assembly includes a Global Positioning Satellite (GPS) signal receiver.

3. The valve tester system of claim 2 wherein the GPS signal receiver is integral with the control means.

4. The valve tester system of claim 2 wherein the GPS receiver is separable from the control means and is configured to communicate with the control means.

5. The valve tester system of claim 1 wherein the valve tester assembly includes means for recording the location of the valve tester assembly during the rotation event.

6. The valve tester system of claim 1 wherein the valve tester assembly includes data storage.

7. The valve tester system of claim 1 wherein the data storage includes rotation parameter data associated with at least two types of valves.

8. The valve tester system of claim 1 additionally comprising an articulated arm assembly for mounting the support of the valve tester assembly to a vehicle.

9. The valve tester system of claim 1 additionally comprising means for recording characteristics of the rotation event of the valve in a record in response to rotation by the rotation means, the record including the location of the valve tester assembly at the time of the rotation event and a time and date of the rotation event.

10. The valve tester system of claim 9 wherein the characteristics of the rotation event recorded by the recording means further includes a peak torque level applied to the valve by the rotation means.

11. The valve tester system of claim 9 wherein the characteristics of the rotation event recorded by the recording means further includes a maximum revolution speed by the rotation means.

12. A valve tester system comprising:
    a valve tester assembly for rotating a valve stem of a valve, comprising:
        a support;
        a motor mounted on the support and configured to rotate a valve during a rotation event;
        a controller configured to control aspects of the rotation event of the valve by the motor; and
        a Global Positioning Satellite (GPS) signal receiver configured to detect a location of the valve tester assembly during the rotation event of the valve;
        wherein the controller is configured to cause the GPS signal receiver to detect the location of the valve tester assembly in response to rotation by the motor.

13. The valve tester system of claim 12 wherein the GPS signal receiver is integral with the controller.

14. The valve tester system of claim 12 wherein the GPS signal receiver is separable from the controller and is configured to communicate with the controller means.

15. The valve tester system of claim 12 wherein the valve tester assembly includes data storage configured to record the location of the valve tester assembly during the rotation event.

16. The valve tester system of claim 12 wherein the data storage includes rotation parameter data associated with at least two types of valves.

17. The valve tester system of claim 12 additionally comprising an articulated arm assembly for mounting the support of the valve tester assembly to a vehicle.

18. The valve tester system of claim 12 wherein the GPS signal receiver detects the location of the valve tester assembly while the valve is being rotated by the valve tester assembly.

19. The valve tester system of claim 12 additionally comprising a memory controller by the controller to have characteristics of the rotation event of the valve recorded in a record in response to rotation by the motor, the record including the location of the valve tester assembly at the time of the rotation event and a time and date of the rotation event.

20. The valve tester system of claim 19 wherein the characteristics of the rotation event recorded by the recording means further includes a peak torque level applied to the valve by the motor.

21. The valve tester system of claim 19 wherein the characteristics of the rotation event recorded by the recording means further includes a maximum revolution speed by the motor.

22. The valve tester system of claim 12 additionally comprising a display responsive to the controller and in communication with the GPS signal receiver, the display being configured to display a location of the valve tester assembly prior to the rotation event.

23. A method of testing a valve, comprising:
positioning a valve tester assembly above the valve with an articulated arm assembly having a first elongated arm and a second elongated arm, the assembly being pivotable about a vertical axis, the first and second arms having a proximate and distal ends, the proximate end of the first arm being adapted for mounting on a support, the proximal end of the second arm coupled to the distal end of the first arm, the valve tester assembly mounted at the distal end of the second arm, the valve tester assembly including
a motor,
motor control,
a GPS which locates the location of the valve tester assembly, and
a rotating connection for rotation by the motor, the rotating connection being configured to connect to a valve to move the valve between and open and closed position, the motor control effective for controlling the rotation of the motor and the valve;
detecting the location of the valve tester assembly with the GPS;
engaging the valve with the rotating connection of the valve tester assembly;
rotating the valve using the valve tester assembly to provide a rotation event;
detecting the rotation event; and
reporting data concerning the detected location and rotation event to a data storage device.

24. The method of claim 23 wherein the detection of the location of the valve tester assemble by the GPS and the reporting the data concerning the detected location are performed while the valve tester assembly is rotating the valve.

25. The method of claim 23 wherein the positioning of the valve tester assembly is done by grasping the assembly by hand and moving it.

26. The method of claim 23 wherein the method further includes creating a map of the location of tested valves from the data reported to the data storage device.

27. The method of claim 23 wherein the first arm and second arm are resiliently biased relative to each other.

28. A valve tester system comprising:
an articulated arm assembly having a first elongated arm and a second elongated arm, the assembly being pivotable about a vertical axis, the first and second arms having a proximate and distal ends, the proximate end of the first arm being adapted for mounting on a support, the proximal end of the second arm coupled to the distal end of the first arm;
a data storage device; and
a valve tester assembly mounted at the distal end of the second arm, the valve tester assembly including
a motor,
motor control,
a rotating connection for rotation by the motor, the connection being configured to connect to a valve to move the valve between and open and closed position, the motor control effective for controlling the rotation of the motor,
a shaft for connecting the rotating connection with a valve being tested, and
a GPS which detects the location of the valve tester assembly and provides location data which is stored in the data storage device.

29. The valve tester system of claim 28 wherein each of the first and second elongated arms are pivotal around a horizontal axis.

30. The valve tester system of claim 28 wherein the data storage device stores data concerning the amount of torque used to rotate valves.

31. The valve tester system of claim 28 wherein, the second arm is pivotal around a horizontal axis and a first resilient biasing assembly is coupled between the first arm and the second arm which resiliently biases the first and second arm relative to each other.

32. The valve tester system of claim 28 wherein the shaft is vertically adjustable.

33. A valve tester system comprising:
a mobile base;
a data storage device;
an articulated arm assembly adapted for coupling to the mobile base,
the arm assembly including a first arm adapted for coupling to the mobile base,
the arm assembly including a second arm pivotally coupled to the first arm,
the arm assembly including a third arm pivotally coupled to the second arm,
a first resilient biasing assembly coupled between the first arm and the second arm which resiliently biases the first and second arm relative to each other, and
a second resilient biasing assembly; and
a valve tester assembly mounted on the third arm of the articulated arm assembly, the valve tester assembly including
a motor,
motor control,
a rotating connection for rotation by the motor, the connection being configured to connect to a valve to move the valve between and open and closed position, the motor control effective for controlling the rotation of the motor, and
a GPS which detects the location of the valve tester assembly and provides location data concerning the valve tester assembly which data is stored in the data storage device,
a shaft between the rotating assembly, the shaft for rotating the shaft and the valve,
the second resilient biasing assembly coupled between the valve tester assembly and the third arm, the second resilient biasing assembly resiliently biasing the valve tester assembly relative to the third arm.

34. The valve tester system of claim 33 wherein the data storage device stores data concerning the amount of torque used to rotate a valve.

* * * * *